(12) United States Patent
Wu et al.

(10) Patent No.: US 6,728,391 B1
(45) Date of Patent: Apr. 27, 2004

(54) MULTI-RESOLUTION LABEL LOCATOR

(75) Inventors: Jianxin Wu, Mahwah, NJ (US); Gregory P. Skinger, Southbury, CT (US); Jason Wang, New City, NY (US); James Recktenwalt, Mahwah, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/454,090

(22) Filed: Dec. 3, 1999

(51) Int. Cl.[7] .............................. G06K 9/00; G06K 9/34; B07C 5/00
(52) U.S. Cl. ...................... 382/101; 382/173; 382/306; 209/583; 209/900
(58) Field of Search ................................ 382/101, 199, 382/102, 256, 224, 217, 282, 306, 173–180, 299; 209/583, 584, 900

(56) References Cited

U.S. PATENT DOCUMENTS

| | | |
|---|---|---|
| 3,715,724 A | 2/1973 | Demonte et al. |
| 3,885,229 A | 5/1975 | Negita et al. |
| 4,286,146 A | 8/1981 | Uno et al. |
| 4,424,588 A | 1/1984 | Satoh et al. |
| 4,504,972 A | 3/1985 | Scherl et al. |

(List continued on next page.)

FOREIGN PATENT DOCUMENTS

| | | |
|---|---|---|
| DE | 195 32 842 C1 | 12/1996 |
| EP | 0 362 595 A3 | 10/1991 |

(List continued on next page.)

OTHER PUBLICATIONS

"An Object Attribute Thresholding Algorithm for Document Image Binarization," Ying Liu & S. Srihari. The Center of Excellence for Document Analysis and Recognition, State Univ. of New York, Buffalo, N.Y., 1993.

(List continued on next page.)

Primary Examiner—Jayanti K. Patel
Assistant Examiner—Aaron Carter
(74) Attorney, Agent, or Firm—Alston & Bird LLP

(57) ABSTRACT

A multi-resolution label locator system divides an input image into a plurality of multi-pixel cells. The multi-resolution label locator system then creates a decimated image or low resolution image corresponding to the input image. The decimated image includes a common-characteristic value that corresponds to a multi-pixel cell of the input image. The multi-resolution label locator system identifies one or more areas within the decimated image that have characteristics corresponding to the characteristics of interest. While generating the decimated image, the multi-resolution label locator system simultaneously creates an edge-occurrence image that corresponds to the input image. The edge-occurrence image includes an edge value that corresponds to each cell of the input image. Each edge value represents the number of occurrences of an edge within the pixels of a corresponding cell of the input image. The multi-resolution label locator system identifies one or more candidate areas within the input image that have decimated-image characteristics and edge-occurrence image characteristics corresponding to the characteristics of interest. The multi-resolution label locator system then classifies the candidate areas according to the likelihood of the input image containing indicia having the characteristics of interest. Lastly, the multi-resolution label locator system compiles a list of one or more candidate areas that most likely contain indicia having the characteristics of interest.

29 Claims, 16 Drawing Sheets

U.S. PATENT DOCUMENTS

| | | | |
|---|---|---|---|
| 4,516,017 A | | 5/1985 | Hara et al. |
| 4,516,265 A | | 5/1985 | Kizu et al. |
| 4,736,441 A | | 4/1988 | Hirose et al. |
| 4,742,556 A | | 5/1988 | Davis, Jr. et al. |
| 4,931,881 A | | 6/1990 | Matsui et al. |
| 4,939,354 A | | 7/1990 | Priddy et al. |
| 4,998,122 A | | 3/1991 | Kanno et al. |
| 5,003,616 A | | 3/1991 | Orita et al. |
| 5,053,609 A | | 10/1991 | Priddy et al. |
| 5,068,909 A | | 11/1991 | Rutherford et al. |
| 5,073,954 A | | 12/1991 | Van Tyne et al. |
| 5,103,489 A | | 4/1992 | Miette |
| 5,124,536 A | | 6/1992 | Priddy et al. |
| 5,126,542 A | | 6/1992 | Priddy et al. |
| 5,153,418 A | | 10/1992 | Batterman et al. |
| 5,166,986 A | | 11/1992 | Mizuoka et al. |
| 5,179,599 A | | 1/1993 | Formanek |
| 5,223,701 A | | 6/1993 | Batterman et al. |
| 5,241,166 A | | 8/1993 | Chandler |
| 5,278,397 A | | 1/1994 | Barkan et al. |
| 5,311,999 A | | 5/1994 | Malow et al. |
| 5,365,597 A | | 11/1994 | Holeva |
| 5,434,629 A | * | 7/1995 | Pearson et al. ............. 348/721 |
| 5,495,537 A | | 2/1996 | Bedrosian et al. |
| 5,502,776 A | | 3/1996 | Manabe |
| 5,515,447 A | | 5/1996 | Zheng et al. |
| 5,581,633 A | | 12/1996 | Hotta et al. |
| 5,642,442 A | | 6/1997 | Morton et al. |
| 5,841,899 A | * | 11/1998 | Ide et al. .................... 382/168 |
| 5,889,885 A | | 3/1999 | Moed et al. |
| 5,912,698 A | | 6/1999 | Graulich et al. |
| 6,205,499 B1 | * | 3/2001 | Houlberg et al. ............. 710/68 |
| 6,343,139 B1 | * | 1/2002 | Finkelstein et al. ......... 382/101 |

FOREIGN PATENT DOCUMENTS

| | | |
|---|---|---|
| EP | 0 326 436 A3 | 4/1992 |
| EP | 0 484 132 A3 | 5/1992 |
| EP | 0 661 889 A2 | 7/1995 |
| JP | 179691 | 10/1984 |
| JP | 01-137385 | 8/1989 |
| JP | 04-268989 | 2/1992 |
| JP | 04-268987 | 9/1992 |
| WO | WO 86/05906 | 3/1986 |
| WO | WO 92/00576 | 7/1991 |
| WO | WO 94/20925 | 3/1994 |
| WO | PCT US 00/42360 | 10/2001 |

OTHER PUBLICATIONS

Run Length Coding Based New Approach to Automatic Image Thresholding, Tao Chen et al., Takagi Lab. Dept. of Electronics Engineering, Institute of Industrial Science, Univ. of Tokyo, Japan.

"Offline Tracing and Representation of Signature," IEEE Transactions on Systems, Man, and Cybernetics, 1992, Jul./Aug., No. 4.

Use of Synthetic Discriminant Functions For Handwritten–Signature Verification, Timothy S. Wilkinson, et al., (1991) 10 Aug. No. 22.

Seong–Whan & Ki–Cheol Kim, Address Block Location On Handwritten Korean Envelopes By The Merging And Splitting Method, 1023 Pattern Recognition vol. 27 (1994) Dec., No. 12, pp. 1641–1651, 1994, Kidlington, Oxford, GB.

Adrian P. Whichello, Hong Yan, Fast Location Of Address Blocks And Postcards In Mail–Piece Images, Pattern Recognition Letters 17 (1996) pp. 1199–1214.

* cited by examiner

MULTI-RESOLUTION LABEL LOCATOR

TECHNICAL FIELD

This invention relates in general to the field of image processing and, more particularly, to a multi-resolution label locator in an automated parcel sorting system.

BACKGROUND OF THE INVENTION

Automated sorting of parcels is becoming very popular because it reduces labor costs while providing fast and reliable parcel delivery services. However, since parcels rarely have the same size and shape, automated parcel sorting that employs image processing to identify address labels becomes very complicated and may be prone to label reading errors.

To capture an image of an address label of a parcel with sufficient quality for a human operator to read and then to key-in the destination address, a camera must scan the surface of a parcel at a relatively high resolution. A high resolution image results in large parcel images and correspondingly large data storage requirements. One problem in the automatic sorting of parcels is processing high resolution parcel images at a rate equivalent to the output of the mechanical section or conveyor system of the automatic parcel sorting system.

In addition to large image processing time, another problem in high resolution image processing of parcels is locating the destination address label. Even with high resolution images, the human operator must still look up, down, or across a screen displaying the image to identify the location of the destination address label. Such eye scans significantly reduce the efficiency of an automatic parcel sorting system.

Other automated parcel sorting systems have attempted to improve efficiency by eliminating the need of a human operator to read and key-in destination addresses of a label. Such other automated parcel sorting systems include devices that employ fiduciary markings and systems that rely on the leading edge of packages having a known shape.

Automated parcel sorting systems that employ fiduciary marks use optical character recognition (OCR) to ascertain the location and orientation of an object or text affixed to an object. For example, an OCR reader system scans a parcel bearing a fiduciary mark and locates the fiduciary mark. In this manner, a fiduciary mark which is placed in a known relation to the destination address block can be used by the OCR system to locate the position of the destination address block. Similarly, an orientation specific fiduciary mark whose orientation is placed in a known relation to the orientation of the text within a destination address block can be used by an OCR system to ascertain the orientation of the text.

While fiduciary mark systems may improve efficiency, these systems require each parcel receiving site to have identical fiduciary markings so that each OCR system can recognize a particular fiduciary mark. Therefore, such systems generally require preprinted labels or parcels comprising the fiduciary mark and specifying a markable area for placing text. Preprinted labels and preprinted parcels are expensive and some percentage of customers will inevitably fail to use them.

For other systems that do not employ fiduciary marks and preprinted labels, the leading edge of parcel with a known shape is utilized to determine the orientation and location of text on a parcel. However, similar to the fiduciary mark systems, these systems do not afford flexibility in the size and/or shape of parcels.

Accordingly, there is a need in the art exists for an automatic parcel sorting system that can readily identify destination address labels within a scanned image of a parcel, regardless of the size and/or shape of the parcel. There is a further need in the art for an automatic parcel sorting system that significantly decreases the amount of time required to process an image or to acquire destination address label data from a scanned image.

SUMMARY OF THE INVENTION

The present invention is a multi-resolution label locator that provides a list of one or more areas within a processed image of a parcel that may contain labels of interest. The multi-resolution label locator is typically part of an automatic parcel sorting system.

The automatic parcel sorting system typically includes a video camera mounted adjacent to a conveyor apparatus. The video camera is operatively linked to two video processors, which produce at least two different kinds of image signals of a parcel. The video processors produce a first decimated (low-resolution) image of the parcel and a second image that corresponds to edge-occurrences of indicia expected to appear on a label, such as text.

The two images produced by the video processor identify different characteristics of the original high resolution image. For example, the decimated-image hardware of the video processor may identify areas in the image that have characteristics typical of labels, whereas the edge-occurrence processor may identify areas that have characteristics typical of text.

The two images are fed into a separate microprocessor, which employs a multi-resolution label locator program to identify one or more areas on the parcel that may contain a label of interest. The multi-resolution label locator program then classifies these areas and compiles a list of these candidate areas based on data extracted from the first and second images produced by the video processor.

Generally stated, the invention is a multi-resolution label locator system for an automatic parcel sorting system. The multi-resolution label locator system obtains a video signal containing a plurality of pixels that define an input image of a substrate. The multi-resolution label locator system divides the input image into a plurality of multi-pixel cells. In subsequent computations, the multi-resolution label locator system extracts feature values corresponding to the preprocessed decimated image and edge-occurrence image.

The multi-resolution label locator system then creates the decimated image (low resolution image) corresponding to the input image in order to reduce the amount of data in the subsequent computations. This decimated image is generated by utilizing a common-characteristic value, such as a single pixel, that corresponds to each multi-pixel cell of the input image. Each common-characteristic value represents a decimated image of the pixels within the corresponding cell. For example, if the multi-resolution locator system is designed to locate labels on a package or parcel, then the system will look for large, relatively white contiguous areas (or areas having a different color depending on the operating environment of the present invention) on the package or parcel since labels generally have a different color or reflect light at a different intensity relative to the package or parcel. Those regions of the parcel or package having a higher light intensity or different color value are assigned a decimated-image value and this data is then mapped to an image space to create the decimated image.

With this decimated image, the feature extraction function implemented on the microprocessor can efficiently extract feature parameters of the label candidate areas. Some of the feature parameters may include: normalized dimensions and areas of the label candidates, aspect ratios, and the relative average light intensities of potential label candidate areas derived from the decimated image. These feature parameters become the input data for the classification function (also discussed infra).

While the first video processor of the multi-resolution locator system is generating the decimated image, the second video processor of the multi-resolution label locator system simultaneously creates an edge-occurrence image that corresponds to the input image. The edge-occurrence image includes an edge value that corresponds to each cell of the input image. Each edge value represents the number of occurrences of edges within the pixels of a corresponding cell of the input image. For example, if the multi-resolution locator system is designed to locate address labels on a package or parcel, the locator system will look for closely spaced black and white transitions, since text on address labels has such characteristics. Bar codes also have black and white transitions, but the transitions are aligned in a uniform orientation. On the other hand, transitions within handwritten or typed text on labels tend to have a random orientation. The multi-resolution locator system therefore utilizes these characteristics to distinguish an address label containing text from a bar code label.

After generating the edge-occurrence and decimated images, the multi-resolution label locator system identifies one or more candidate areas within these images that have decimated-image characteristics and edge-occurrence characteristics corresponding to the characteristics of interest. This identification includes further processing of the separate images. Specifically, the multi-resolution label locator program then classifies the candidate areas according to the likelihood of the input image containing indicia having the characteristics of interest. Based on these characteristics, the multi-resolution label locator module then compiles a list of one or more candidate areas that most likely contain indicia having the characteristics of interest.

Decimated-image Attributes

The multi-resolution label locator system creates the decimated image by computing a histogram of pixel values occurring within each cell of the input image. For example, the common-characteristic value or pixel value may correspond to the approximated color for each pixel. The multi-resolution label locator system then selects from the histogram a mode value corresponding to the pixel value that most frequently occurs within a respective cell of the input image. The multi-resolution label locator system then sets a respective common-characteristic value in the decimated image for the cell to the mode value.

To identify one or more candidate areas within the decimated image having characteristics corresponding to the expected characteristics of the indicia, the multi-resolution label locator system computes a common-characteristic histogram corresponding to the decimated image. The multi-resolution label locator system then smoothes the common-characteristic histogram with both a low-pass filter and an adaptive-moving-window filter.

To separate label candidates from a parcel background, the multi-resolution label locator system selects one or more peak values from the filtered common-characteristic histogram and isolates a peak region around each peak value by identifying upper and lower bounding valley values. The multi-resolution label locator system then creates a segmented image by mapping the pixels within each peak region into a blank image corresponding to the decimated image. Subsequently, the multi-resolution label locator system identifies one or more connected components within the segmented image that correspond to the characteristics of interest. This produces a segmented image in which blobs or candidate areas are circumscribed by a bounding window or box.

For each bounding window, the multi-resolution label locator module computes one or more feature values that can include geometrical characteristics of the bounding window and/or relative average-light-intensity values for cells within the bounding window. Other feature values can include normalized dimensions of the bounding windows, normalized areas for the bounding windows, and aspect ratios for the bounding windows. Typically, these feature values are invariant with respect to the orientation and lighting of the camera. In other words, these feature values do not change if the camera orientation is modified or if background lighting changes. After the feature values are obtained, the multi-resolution label locator module then assembles a feature vector including the bounding window feature values, and the feature values for the area within the bounding window.

Edge-occurrence Image Attributes

To create the edge-occurrence image, a black/white threshold function of the first video processor of the multi-resolution label locator system binarizes the pixel values within each cell of the input image. To binarize pixel values within a cell of the input image, the multi-resolution label locator system applies an adaptive binarizing technique to the pixel values within the cell to select a threshold for binarizing the pixel values based on the identified background pixel values. The multi-resolution label locator system then identifies transitions in expected orientations among the binarized pixel values within each cell. The multi-resolution label locator system then computes a totalized edge-occurrence value for each cell based on transitions within the cell and sets the edge value for each cell to the totalized edge-occurrence value for the pixels within the cell.

The multi-resolution label locator system identifies these transitions in a particular cell by comparing the pixel values within the cell to a plurality of templates that define pixel patterns that are among the characteristics of interest. The multi-resolution label locator system then totalizes transitions in expected orientations among the binarized pixel values within the cell by also defining counters for each orientation. For each template, the multi-resolution label locator system compares instances of each template to non-overlapping, contiguous portions of the cell having the same size as the template such that each pixel of the cell is compared to at least one instance of the template. The multi-resolution label locator system then identifies one or more matching pixel patterns within the cell that correspond to a pixel pattern defined by the template. The multi-resolution label locator system identifies an orientation associated with the pixel pattern and increments one or more of the counters in response to the occurrence of each matching pixel pattern.

To compute the totalized edge-occurrence value for each cell based on the transitions and their respective counter values, the multi-resolution label locator system applies a totalization formula that filters the counter values to increment the totalized edge-occurrence value in response to random orientations that indicate the presence of text within the cell. With this totalization formula, the multi-resolution label locator system avoids incrementing the totalized edge-occurrence value in response to uniform or parallely spaced transitions that indicate the presence of a barcode within the cell. This allows the multi-resolution label locator system to eliminate candidate areas within the input image that correspond to barcode labels that do not contain text and hence destination address information.

Bounding Window Attributes

The multi-resolution label locator system may compute many different feature values for each bounding window. One feature value includes a normalized height representing a ratio of a height defined by the bounding window to height defined by the segmented image. Another bounding window feature value includes a normalized width representing a ratio of width defined by the bounding window to width defined by the segmented image. An additional bounding window feature value includes a normalized area representing the ratio of an area defined by the bounding window to an area defined by the segmented image. Another bounding window feature value includes an aspect ratio representing a ratio of the width defined by the bounding window to the height defined by the bounding window.

In addition to the bounding window feature values, the multi-resolution label locator system can compute many different feature values that correspond to the average light intensity for cells within the bounding window. The multi-resolution label locator system may compute a feature value based upon a normalized edge-occurrence intensity representing a ratio of the sum of edge-occurrence values for cells within the bounding window to a total number of cells within the bounding window. The multi-resolution label locator system may also compute a feature value based upon a normalized edge-occurrence intensity representing a ratio of the sum of the totalized edge-occurrence values for cells within the bounding window to an area defined by the bounding window. To remove noise when computing the normalized edge-occurrence intensity (the transition intensity for the preferred embodiment), the multi-resolution label locator system zeroes totalized transition values for cells within the bounding window below a predefined threshold value.

Pre-classification and Classification of Candidate Areas

Based upon the feature value characteristics, the multi-resolution label locator system may pre-classify candidate areas by applying threshold values that are typical of the characteristics of interest. For example, if the multi-resolution locator is designed to find destination address labels on a package or parcel, the multi-resolution locator can eliminate candidate areas based upon a size of the area since labels typically have a minimum and maximum size. The multi-resolution label locator system can then eliminate one or more candidate areas having a corresponding bounding window defining an area below a predefined minimum threshold value. Similarly, the multi-resolution label locator system can eliminate one or more candidate areas having a corresponding bounding window defining an area above a predefined maximum value. In addition, the multi-resolution label locator system may crop one or more candidate areas to correspond to a bounding window having a predefined size centered about a center of mass computed for the feature values of the corresponding candidate area.

After pre-classifying candidate areas, the multi-resolution label locator system classifies the candidate areas according to the likelihood of containing indicia having the characteristics of interest by comparing respective feature vectors of respective candidate areas. To create a list that classifies the candidate areas, the multi-resolution label locator system computes a first decision value corresponding to one of more of the bounding window feature values by comparing the bounding window feature value to an expected value of the bounding window feature value. In this case, the expected value of the bounding window feature value is among one of the characteristics of interest. For example, in a label locator design, the bounding window of an actual label may have a predetermined expected area, a predetermined expected perimeter, and/or a predetermined expected aspect ratio.

After computing a first decision value based on the bounding window feature values, the multi-resolution label locator system then computes a second decision value corresponding to one or more the remaining feature values (i.e., other than the bounding window feature values) by comparing the feature values to expected values of the feature values. The expected values of the feature values are also among the characteristics of interest.

After computing decision values, the multi-resolution label locator system may list candidate areas in a prioritized order by defining a decision space having a plurality of decision sub-spaces. The multi-resolution label locator system then calculates the decision spaces and maps the feature vectors to the decision spaces based on the relative values of the bounding window and feature values of the feature vectors.

Hardware Components

The present invention may be embodied in a video image system operable for receiving a data stream comprising pixel values defining an input image and processing the pixel values to locate indicia within the input image having characteristics of interest. The video-image system typically includes a first image video processor operable for dividing the input image into a plurality of multi-pixel cells. The video image system also creates a decimated image corresponding to the input image comprising an element corresponding to each cell of the input image.

Each element of the decimated image represents a common characteristic, such as an average light intensity, of the pixels within a corresponding cell of the input image. To generate the decimated image, the first video image processor includes a buffer memory operative to serially receive pixel values. The first video image processor is typically implemented within a field programmable gate array (FPGA) connected to the buffer memory and operative to receive a pixel stream. The first video image processor further includes a static memory device and is configured to perform its operations as the pixels flow through the FPGA.

In addition to the first video processor, the video image system typically includes a second video processor operable for creating an edge-occurrence image corresponding to the input image comprising an element corresponding to each cell of the input image. Each element of the edge-occurrence image represents the number of occurrences of an edge within the pixels of the corresponding cell of the input image.

Like the first video processor, the second video processor is typically implemented within a FPGA. To create the edge-occurrence image, the second video image processor typically includes a buffer memory operatively linked to a plurality of shift registers. The plurality of shift registers are operatively linked to a dynamic memory device.

A third video processor, preferably configured as a software system running on a general purpose computer, identifies one or more regions within the decimated image having characteristics corresponding to the expected characteristics of the indicia. The third video processor combines the decimated image and the edge-occurrence image and classifies candidate areas according to the likelihood of these areas containing indicia having the characteristics of interest. After classifying, the third video processor compiles a prioritized list of one or more candidate areas that most likely contain indicia having the characteristics of interests.

To combine the data of the first and second video processors and to compute the prioritized list of candidate areas, the third video image processor includes a central processing unit and memory storage device. The third video image processor is operable for identifying one or more candidate areas within the input image having decimated image characteristics and edge-occurrence image characteristics corresponding to the characteristics of interest. The third video image processor is further operable for classifying the candidate areas according to the likelihood of containing indicia having the characteristics of interest and compiling a prioritized list of the one or more candidate areas that most likely contain indicia having the characteristics of interest.

Exemplary Operating Environment

The present invention provides a system operable for locating labels having characteristics of interest on a moving stream of parcels or packages. The system includes a package, a conveyor operable for moving the package, and video device positioned adjacent to, and typically above, the conveyor. The video device scans each package as each package passes by the video device. The video processor, operatively linked to the video device, generates a decimated image and edge-occurrence image of the package.

To evaluate the decimated image and edge-occurrence image, the system further includes a microprocessor operatively linked to the video processor. The microprocessor compiles a prioritized list of one or more candidate areas that most likely contain indicia having the characteristics of interest.

That the invention improves over prior automated parcel sorting systems and accomplishes the advantages described above will become apparent from the following detail description of the exemplary embodiments and the appended drawings and claims.

BRIEF DESCRIPTION OF THE DRAWINGS

FIG. 11 is a functional block diagram of the hardware responsible for generating the decimated image of the multi-resolution label locator system.

DETAILED DESCRIPTION OF EXEMPLARY EMBODIMENTS

It should be understood that the programs, processes, methods, etc., described herein are not related or limited to any particular computer, processor, or apparatus. Rather, various types of computing devices may be used to perform the method steps herein. In particular, the preferred embodiments described herein rely upon one or more field programmable gate arrays (FPGAs) to perform the computer-implemented processes described herein. However, it will be appreciated that other types of computing devices, such as traditional von Neumann processors or other types of dedicated hardware systems, could equivalently be used to perform the methods steps described herein.

Figure 1:
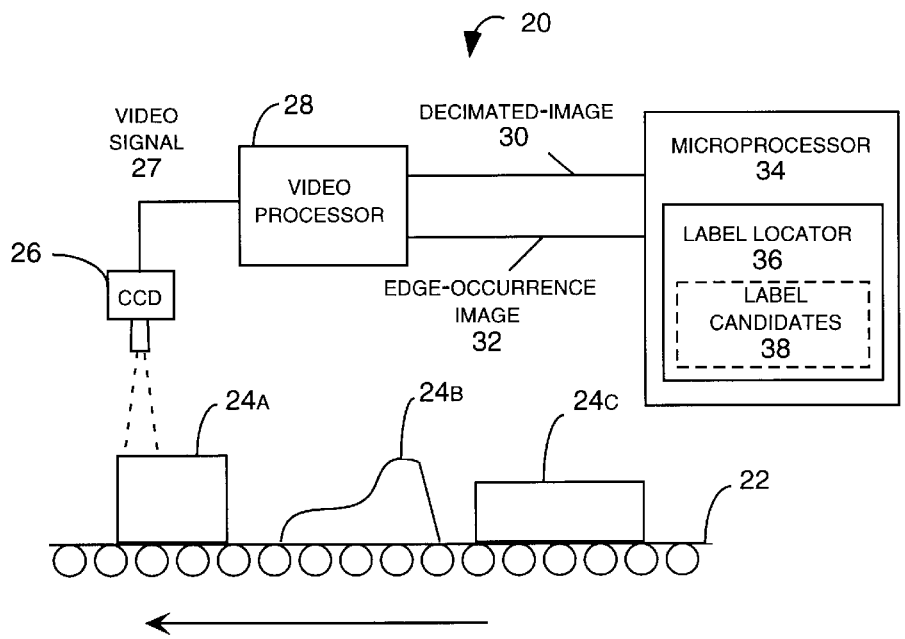
FIG. 1 is functional block diagram of an over-the-belt multi-resolution label locator system that provides the operating environment for the illustrative embodiments of the present invention.

Description of the Operating Environment of the Preferred Embodiments of the Present Invention Referring now to the drawings, in which like numerals indicate like elements throughout the several figures, FIG. 1 is a diagram of a multi-resolution label locator system 20 that provides the operating environment for the illustrative embodiments of the invention. The multi-resolution label locator system 20 includes a conveyor 22 carries parcels 24a–24c. A CCD camera 26 produces a standard analog video image of the conveyor 22 and the surface of parcels 24a–24c from reflected light as the parcels 24a through 24c past beneath the CCD camera 26.

The CCD camera 26 may be a monochrome, 4,096 pixel line-scan type camera such as one using a Thompson TH7833A CCD chip. The resolution of the analog image created by the CCD camera 26 is approximately 187 pixels or "dots" per inch (DPI) across the conveyor 22. In practice, every other pixel may be eliminated from one image to produce a 93 DPI video image to reduce the amount of data to be processed.

A video processor 28 converts the analog video image produced by the CCD camera into an 8-bit gray scale video signal. The video processor 28 then converts this 8-bit gray scale video signal into a decimated-image signal 30. The video processor 28 also converts the 8-bit gray scale video signal into an edge-occurrence image signal 32.

The video processor 28 transmits the decimated-image signal 30 and edge-occurrence image signal 32 to a host computer or microprocessor 34 that includes a multi-resolution label locator program 36. The multi-resolution label locator program 36 compiles a prioritized list of one or more candidate areas or label candidates 38 that most likely contain destination address labels.

In summary, the video processor 28 of the multi-resolution label locator system 20 converts the analog video signal 27 into an 8-bit gray scale video signal. The video processor 28 then converts this 8-bit gray scale video signal into a decimated-image signal 30. In addition, the video processor 28 converts the 8-bit gray scale video signal into an edge-occurrence image signal 32. The video processor 28 then transmits the decimated-image signal 30 and the edge-occurrence image signal 32 to the host computer or microprocessor 34, where a multi-resolution label locator program 36 extracts data from the decimated-image signal 30 and edge-occurrence image 32 to produce the prioritized list of label candidates 38.

Figure 2:
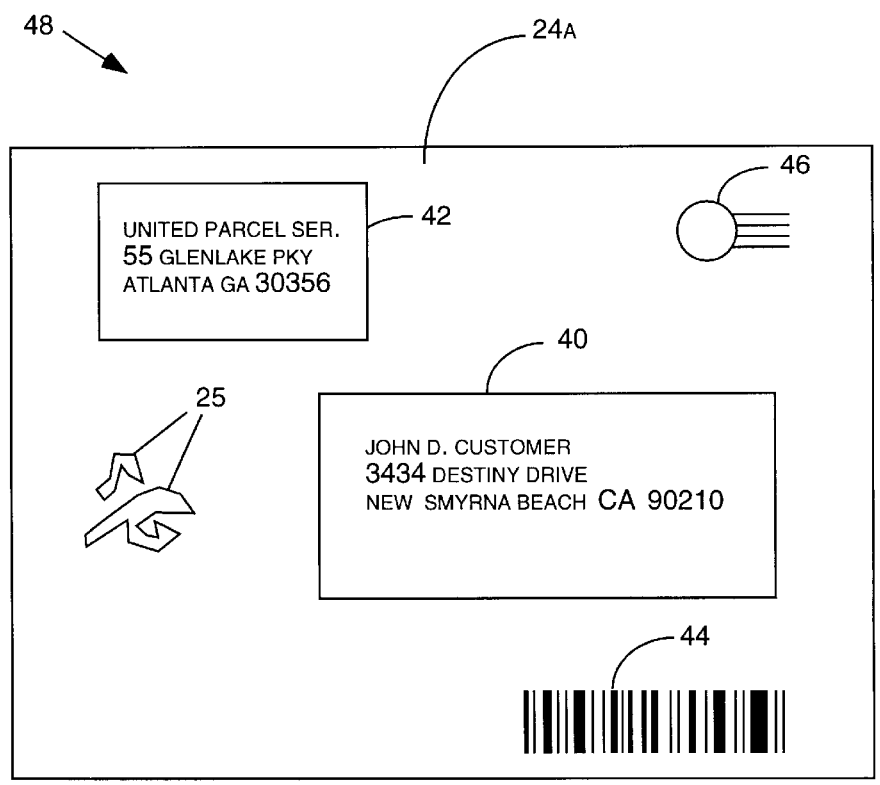
FIG. 2 is block diagram illustrating a substrate of interest for the multi-resolution label locator system.

FIG. 2 illustrates a surface of the parcel 24a scanned by the CCD camera 26, in which the parcel is the object of the decimated image and edge-occurrence signals. The parcel 24a includes a destination address label 40 and an origination address label 42. The parcel 24a bears a barcode 44, which usually includes a code corresponding to the shipping party and a unique tracking a code assigned to the package by the parcel shipping company. The parcel 24a further includes a postage franking mark 46 and extraneous markings 25 that are scanned by CCD camera 26. The extraneous markings 25 are incidental items on a parcel package that typically occur during handling of the package. The markings 25 may be ink marks, dirt, or other debris that may come in contact and "mark" the package during shipping. The CCD camera 26 produces a digital video image 48 that captures the aforementioned labels 40 and 42, barcode 44, extraneous markings 25, and postage franking mark 46.

The two-dimensional pixelized image 48 is divided into a plurality of cells (shown in FIGS. 5–8). Each cell of the two-dimensional pixelized image 48 preferably includes 32 collinear pixels of 32 consecutive scan lines forming a 32 pixel by 32 pixel square or rectangle (i.e. 32 columns and 32 rows of pixels). Each cell of the two-dimensional pixelized image 48 is a square with each side approximately one-third of an inch (0.85 centimeters). It will therefore be appreciated that 32 scanned lines comprise 128 cells that are lined up side-by-side across the conveyor 22. The cells provide a fixed frame of reference within which the multi-resolution label locator system identifies label candidates 38.

Overview of Multi-resolution Label Locator System

Figure 3:
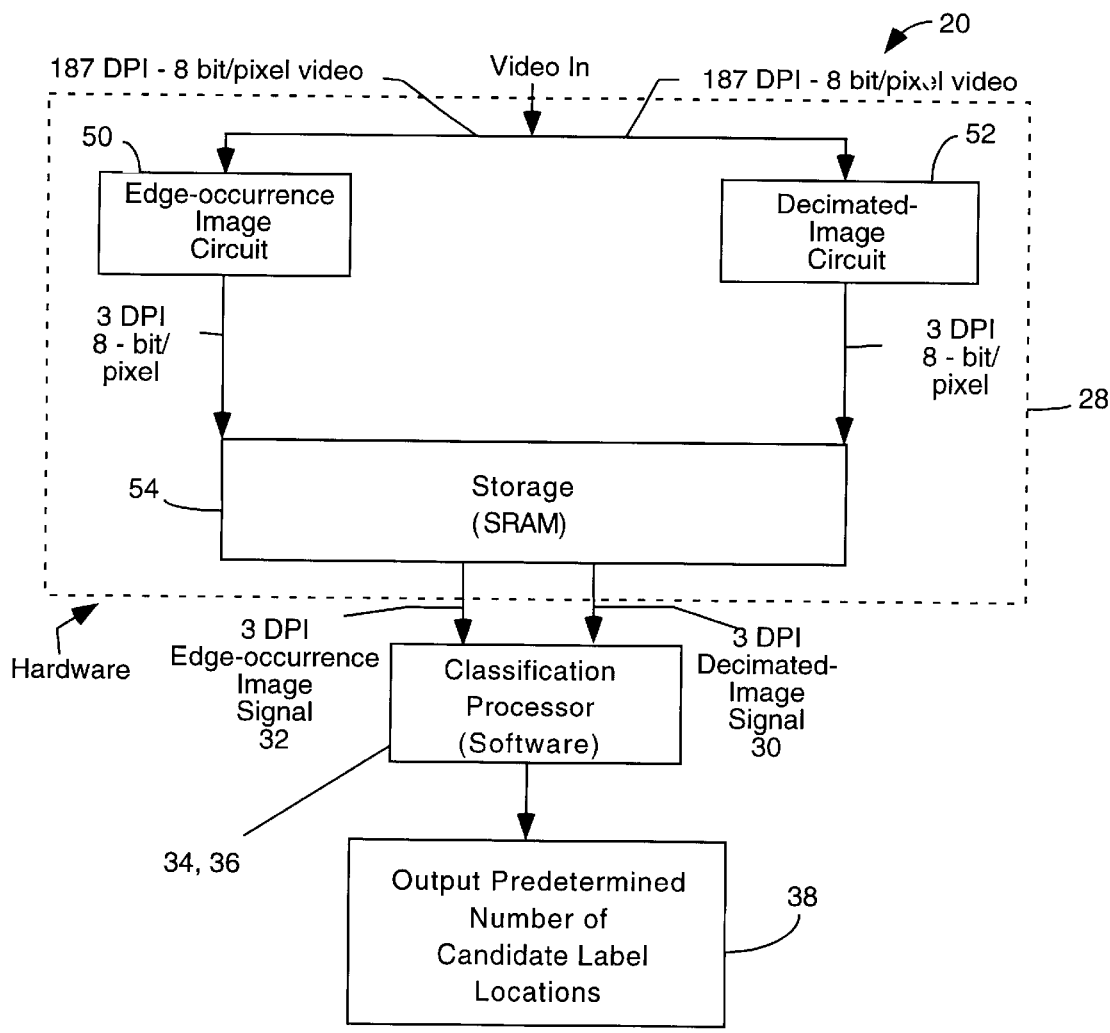
FIG. 3 is a functional block diagram illustrating a multi-resolution label locator system in accordance with an exemplary embodiment of the present invention.

FIG. 3 illustrates a more detailed functional block diagram of the multi-resolution label locator system 20. The video processor 28 of the multi-resolution label locator system 20 includes an edge-occurrence image circuit 50 and a decimated-image circuit 52. Both the edge-occurrence image circuit 50 and decimated-image circuit 52 convert the 187 DPI—8-bit/pixel analog video signal into 3 DPI—8-bit/pixel digital video signals. A storage device 54 such as an SRAM stores the processed 3 DPI—8-bit/pixel video signals received from the edge-occurrence image circuit 50 and the decimated-image circuit 52.

The video processor 28 which includes the decimated image and edge-occurrence image circuits 50 and 52 is typically implemented in hardware such as FPGAs that generate the output images as the pixel data flows through the hardware. The video processor 28 transmits the 3 DPI edge-occurrence image signal 32 and the 3 DPI decimated-image signal 30 to a classification processor, which includes the microprocessor 34 and the multi-resolution label locator program 36. The classification processor 34, 36 can be a conventional workstation or personal computer that can run the multi-resolution label locator program.

The classification processor 34, 36 identifies one or more candidate areas within the input image that has decimated-image characteristics and edge-occurrence image characteristics. The classification processor 34, 36 classifies the candidate areas according to the likelihood of containing labels of interest. The classification processor 34, 36 compiles a prioritized list of one or more candidate areas within the input image of the parcel 24a that most likely contain address labels. The classification processor 34, 36 then outputs a predetermined number candidate label locations 38.

Alternate Embodiments of the Invention

Because of the speed and size increases of processors, those skilled in the art will recognize that the multi-resolution label locator program may also be implemented within other program modules within a single processor. Generally, program modules include routines, programs, components, data structures, etc. that perform particular tasks or implement particular abstract data types. Moreover, those skilled in the art will appreciate that the invention may be practiced with other computing system configurations, including hand-held devices, multiprocessor systems, microprocessor-based or programmable consumer electronics, mini computers, mainframe computers, and the like. The invention may also practiced in distributed computing environments where tasks are performed by remote processing devices that are linked through a communications network.

While the present invention is preferably employed in an automated parcel sorting environment, the invention is not limited to this application and can be used in other areas that require the identification of a first object or first set of objects present on a second object. For example, the present invention may be employed to locate specific elements such as conductor lines or microchips on a circuit board. In this application, the decimated-image circuit 52 could identify high-level attributes of the conductor lines or microchips while the edge-occurrence image circuit 50 could look for discrete differences between the conductor lines or microchips on a smaller scale relative to the decimated-image circuit 52.

Similar to circuit board example, the multi-resolution locator system could be alternatively employed to identify fluorescent markings on parcels or to identify specific shapes on parcels such as hexagon shapes that may indicate franking or the like. As another alternative, the multi-resolution label locator could be used to could be used in a manufacturing environment to locate defects in products such as cracks or other defects detectable by video image processing. Other manufacturing applications could include the identification of defects in the manufacture of colored fabrics or other products having visual characteristics that are readily detectable by video image processing. Thus, the present invention can be employed in many different environments where visual characteristics of an object are readily detectable by video image processing.

Overview of Multi-resolution Locator System

Figure 4:
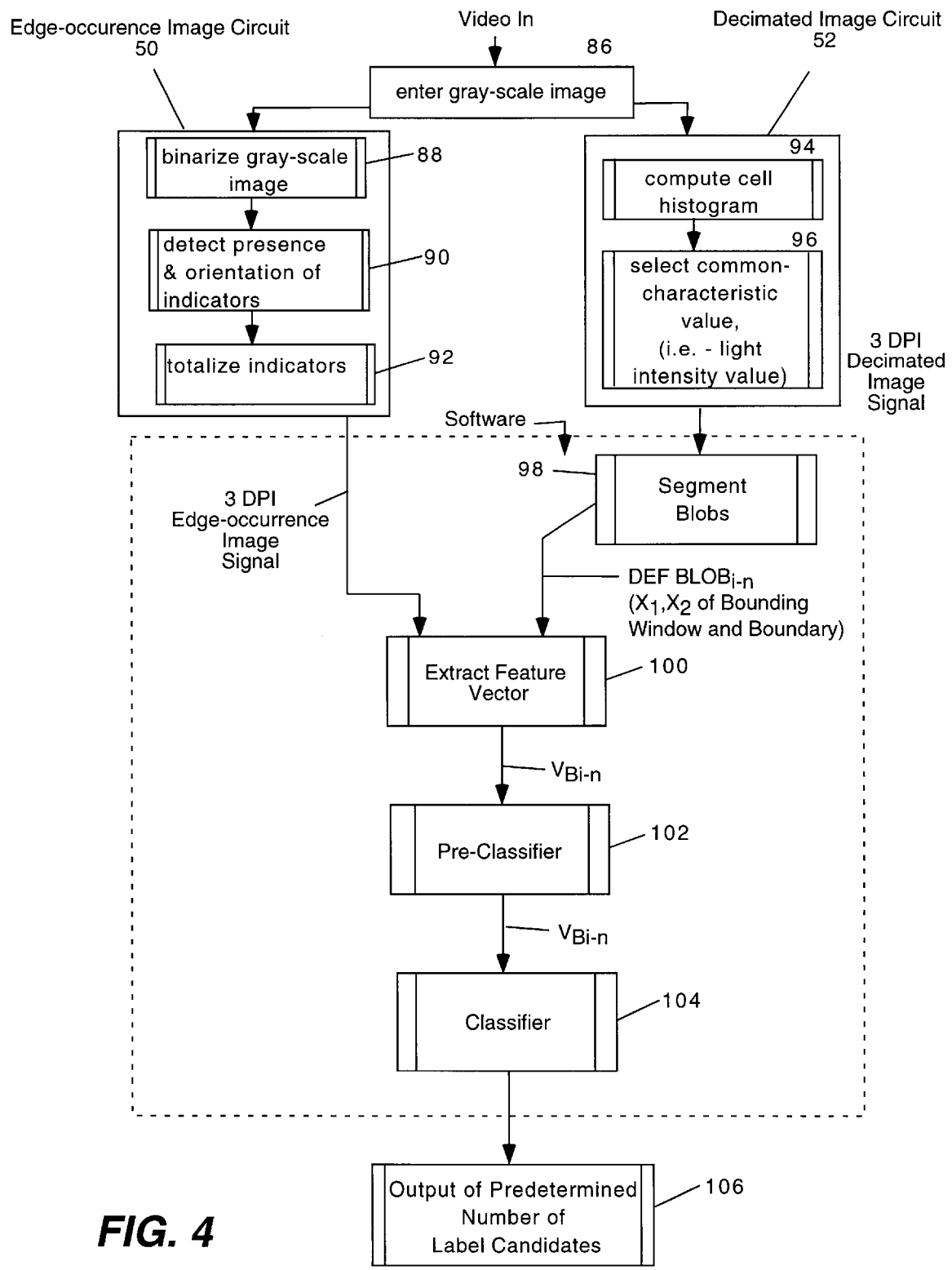
FIG. 4 is a more detailed logic flow diagram that identifies the hardware and software for the multi-resolution label locator system.

FIG. 4 is a logic flow diagram of a computer-implemented process for the multi-resolution label locator system 20. In step 86, the gray scale image generated by the CCD camera 26 is split between the edge-occurrence image circuit 50 and the decimated-image circuit 52. While the operation of steps of the edge-occurrence image circuit 50 and decimated-image circuit 52 will be described separately, it is noted that both circuits process the gray scale image signal received from the CCD camera 26 simultaneously.

Figure 7:
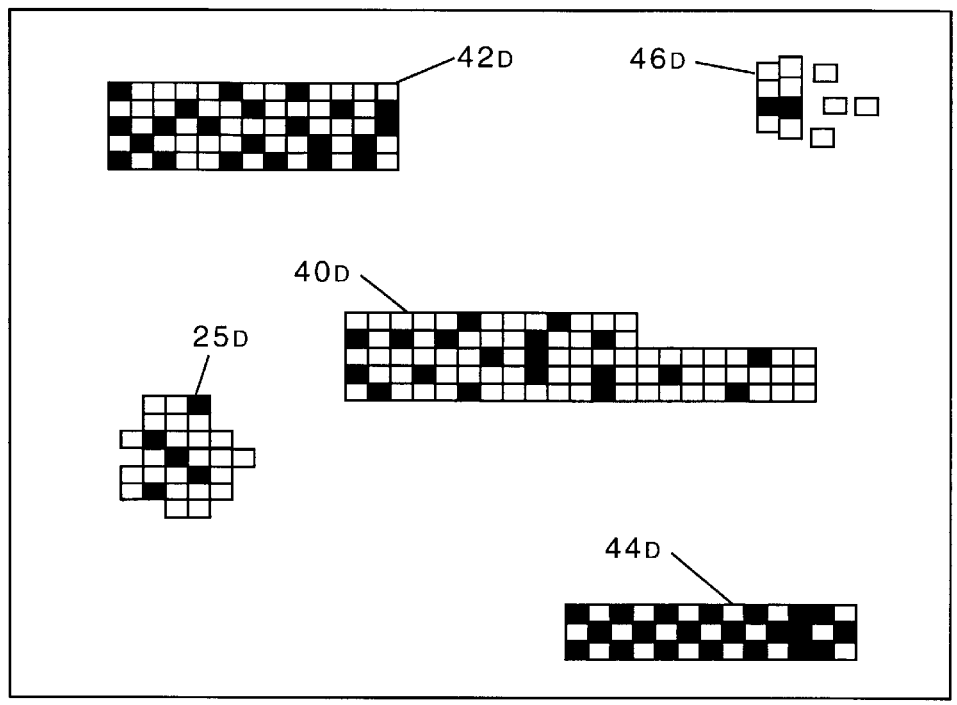
FIG. 7 is a diagram that illustrates an edge-occurrence image generated by a one of the video image processors of the multi-resolution label locator system.

In routine 88, the edge-occurrence image circuit 50 binarizes the gray-scale image received from the CCD camera to produce the edge-occurrence image as illustrated in FIG. 7. Specifically, in routine 88, the digitizer 66 employs an adaptive thresholding technique or similar process to convert the analog signal produced by the CCD camera 26 to into a one-bit (i.e., black/white) digital video signal.

In the preferred embodiment, during routine 88, the edge-occurrence image circuit 50 employs a 4 by 4 pixel window to detect the transitions (edge occurrences) within the binarized image. Specifically, the edge-occurrence image circuit 50 employs a set of predefined 4 by 4 templates to detect the spatial orientation of edge occurrences of a 4 by 4 pixel window of the cell being analyzed.

An example of a 4 by 4 pixel window is shown by the following table:

TABLE 1

| Pixel Window | | | |
|---|---|---|---|
| 0 | 0 | 0 | 0 |
| 0 | 0 | 0 | 0 |

TABLE 1-continued

| Pixel Window | | | |
|---|---|---|---|
| 0 | 0 | 0 | 0 |
| 0 | 1 | 1 | 1 |

In Table 1, zeros (0) represent empty regions in a pixel of the cell of interest while ones (1) represent the presence of an object or marking in a pixel of the cell of interest. Table 1 indicates the presence of a horizontal line in three columns in the last row of the table. Each of the locations in Table 1 are assigned a numeric value based on Table 2:

TABLE 2

| Assignment Table | | | |
|---|---|---|---|
| 32768(3,3) | 16384(2,3) | 8192(1,3) | 4096(0,3) |
| 2048(3,2) | 1024(2,2) | 512(1,2) | 256(0,2) |
| 128(3,1) | 64(2,1) | 32(1,1) | 16(0,1) |
| 8(3,0) | 4(2,0) | 2(1,0) | 1(0,0) |

In Table 2, the numbers in the parentheses define the relative location of the pixels in Table 1. Each location in the table also represents a specific bin of a sixteen-bit register. The first number in each parentheses is the column number of the 4 by 4 pixel window while the second number is the row number of the 4 by 4 pixel window. The numbers outside the parentheses are the decimal equivalents for the relative location of a respective bin in the sixteen bit register. Summing these values allows every possible pattern with the 4 by 4 window to be represented by a unique decimal value.

For the 4 by 4 pixel window of Table 1, the pattern value is calculated to be seven (7). This pattern value of seven (7) is based on a summation of the following locations in the 4 by 4 cell of Table 2: 1(0,0), 2(1,0), and 4(2,0) where 1+2+4=7. The pattern value of seven (7) is then compared to a pattern value/weighted value look up table. That is, each pattern is assigned a weight, which is indexed to the pattern through a table using the pattern's associated pattern value to identify the pattern. A pattern value of seven (7) in a look-up table has been assigned a weighted value of one-hundred-two (102).

The pattern value look up table has ten different values that correspond to different orientations or combinations of orientations that are assigned to groups of pattern values. In other words, all of the patterns in a particular group are considered to have the same orientation or combination of orientations, and this orientation or combination of orientations is represented by the pattern value assigned to the group. Specifically, each digit of the lower four digits of the pattern value corresponds to a particular orientation as follows: 135°, 90°, 45°, 0°. That is, the binary "0" bit (least significant bit) corresponds to an orientation of 0°, the binary "1" bit (second least significant bit) corresponds to an orientation of 45°, the binary "2" bit (third least significant bit) corresponds to an orientation of 90°, and the binary "3" bit (fourth least significant bit) corresponds to an orientation of 135°.

Each pattern value relies on this bit-based orientation designation to indicate which orientation or combination of orientations appears in the corresponding group of patterns. For example, the pattern value 65 has a binary value of 0010 0001. The least significant four digits, 0001, indicates an orientation of 0° (i.e., the 135° bit is not set, the 90° bit is not set, the 45° bit is not set, and the 0° bit is set.) Thus, all of the patterns in the group of patterns assigned the pattern value of 65 are considered to exhibit an orientation of 0°.

Similarly, the pattern value 66, which has a binary value of 0010 0010, indicates an orientation of 45° (i.e., the 135° bit is not set, the 90° bit is not set, the 45° bit is set, and the 0° bit is not set). Thus, all of the patterns in the group of patterns assigned the pattern value of 66 are considered to exhibit an orientation of 45°. And the pattern value 108, which has a binary value of 0110 1100, indicates a combination of 135° and 90° orientations (i.e., the 135° bit is set, the 90° bit is set, the 45° bit is not set, and the 0° bit is not set). Thus, all of the pattern in the group of patterns assigned the pattern value of 108 are considered to exhibit orientations of 135° and 90°.

In routine 90, the edge-occurrence circuit 50 detects the presence and orientation of the binarized pixel values within a cell. The term "edge occurrence" means that for certain indicia on a substrate or object, there are particular surfaces on the indicia that, when present with a relatively high frequency, indicate the presence of such indicia. For example, handwritten labels will have a particular set of edge characteristics that are different from a set of edge characteristics for a barcode label. Alternatively, when the multi-resolution locator system is employed in other environments, such as in circuit board manufacturing, the edge-occurrence circuit 50 will produce an edge-occurrence image showing certain microchips or lead lines that have a set of edge characteristics with a relatively high frequency that are different or unique relative to other microchips or lead lines and the printed circuit board itself.

As illustrated in FIG. 7, the edge-occurrence image 58 shows the different feature values between the label candidate areas 25D, 40D, 42D, 44D, and 46D. The edge-occurrence image 58 shows how the representations of the type written labels 40D, 42D differ from the representation of the bar code 44D. Specifically, the type written label representations 40D and 42D have randomly oriented colored pixels while the bar code representation 44D has colored pixels oriented in a uniform manner. Routine 90, which provides an illustrative method for identifying the aforementioned differences between label candidate areas, is described in further detail below with respect to FIG. 12.

In routine 92, the edge-occurrence image circuit 50 totalizes the transitions for each cell of the edge-occurrence image 58. Further details of Routine 92 will be discussed with reference to FIG. 13.

During routines 88–92, the multi-resolution label locator system simultaneously carries out routines 94–98. In routine 94, the decimated-image circuit 52 computes a histogram of pixel values occurring within a cell of the gray scale image of the parcel or substrate. Further details of routine 94 are described with respect to FIG. 14.

Figure 5:
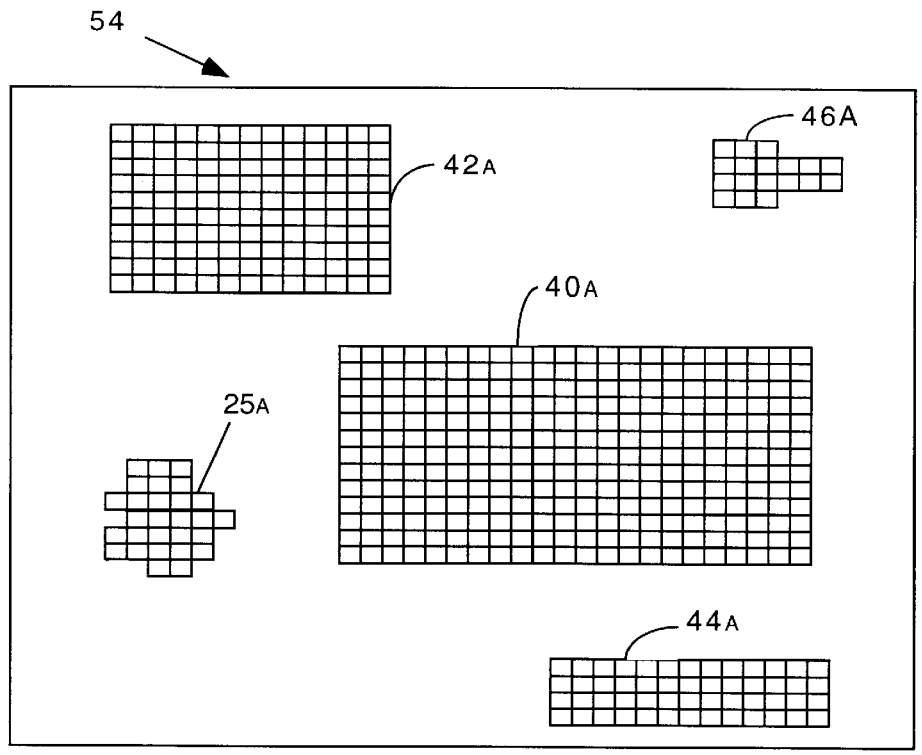
FIG. 5 is a diagram that illustrates a decimated image of the substrate of a parcel of interest.

In routine 96, the decimated-image circuit 52 selects, from the histogram generated in routine 94, a decimated-image value corresponding to the pixel value most frequently occurring within the cell. The term "decimated image" for a label locator application of the present invention means an image that is obtained by low-pass filtering and applying an adaptive-moving-window filter to an input image and then sub-sampling of the filtered image. The "common-characteristic value" is a single value representative of the character of an entire corresponding cell. For example, the common-characteristic value of a cell may be the "mode" or most frequently occurring pixel value within the cell. In this case the common-characteristic value is the peak value, which is mapped to the physical location of the corresponding cell in an image space. This common-characteristic value is preserved as a pixel value which becomes the basis for the "decimated-image" image as illustrated in FIG. 5. That is, the decimated-image circuit 52 maps cell mode values to an image space to produce the decimated image of 54, as illustrated in FIG. 5.

Abrupt changes in the decimated image 54 in FIG. 5 typically identify label candidate areas 25A, 40A, 42A, 44A, and 46A. The aforementioned label candidate areas generally include areas with characteristics (pixel values) that are different from the background or parcel surface 24a. The decimated image 54 thus shows an "overview" or "high level" or "low resolution" picture of the major visual differences between the areas of interest (such as labels) and the background (a surface of a parcel). For example, the label candidate areas 25A, 40A, 42A, 44A, and 46A in FIG. 5 are represented by small squares linked together while the remaining empty areas of the parcel surface do not have any surface representation. The decimated-image circuit 52 views the article of interest at a macroscopic level as compared to the more narrowed focus of the edge-occurrence image circuit 50. Further details of how the multi-resolution label locator system produces the decimated image 54 in routine 96 will be described in the discussion of the logic flow diagram of FIG. 15.

The decimated-image 54 and edge-occurrence image 58 are both 3 DPI image signals that are derived from the original 187 DPI image signal. After the decimated-image circuit 52 and edge-occurrence image circuit 50 generate their respective images 54 and 58, the remaining steps/routines 98–106 of the multi-resolution label locator system 20 are preferably performed by the multi-resolution label locator program 36.

Figure 6:
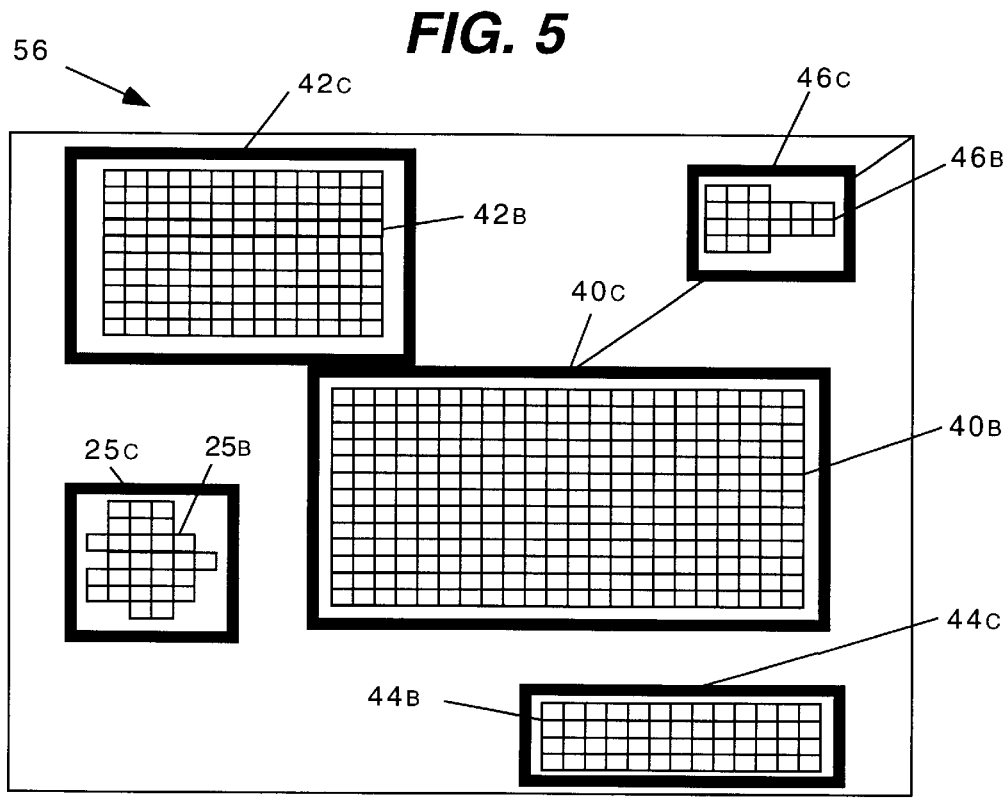
FIG. 6 is a diagram that illustrates a segmented image generated from the decimated image.

In step 98, the multi-resolution label locator program 36 segments blobs or, in other words, creates a segmented image 56 as illustrated in FIG. 6 by mapping pixels of peak regions into a blank image corresponding to the decimated-image 54. To create the segmented image 56, the multi-resolution label locator program 36 generates a decimated-image histogram derived from the decimated image 54. Further, in step 98, the multi-resolution label locator program 36 identifies one or more connected components within the segmented image 56 and generates bounding windows 25C, 40C, 42C, 44C, and 46C. The details of step 98 will be described with respect to FIG. 18.

Figure 8:
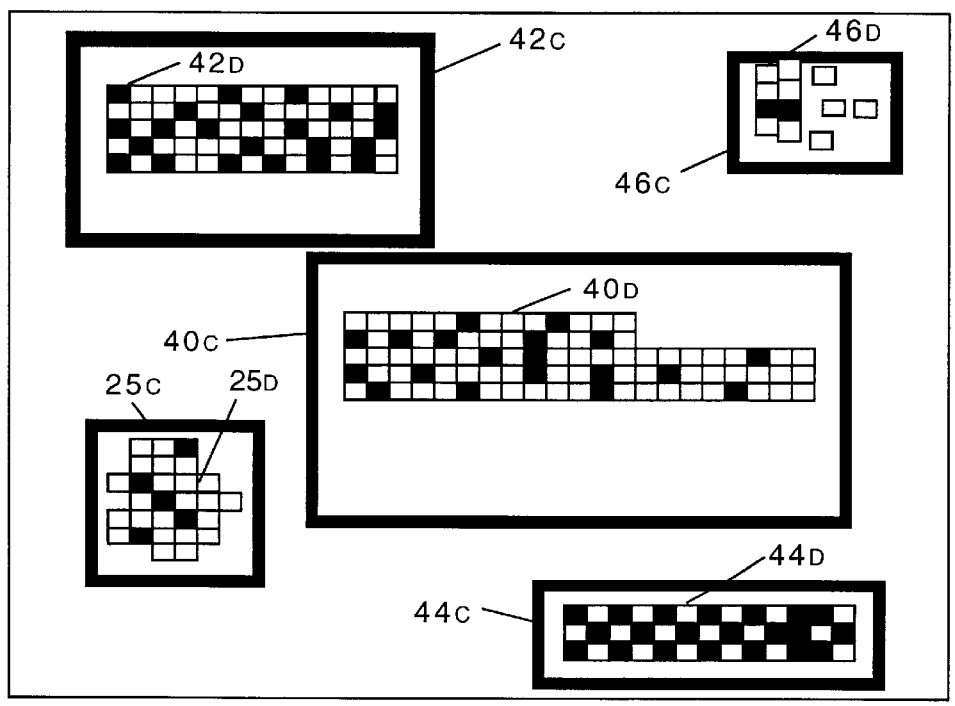
FIG. 8 is a diagram that illustrates the bounding windows from the segmented image being mapped to the edge-occurrence image.
Figure 19:
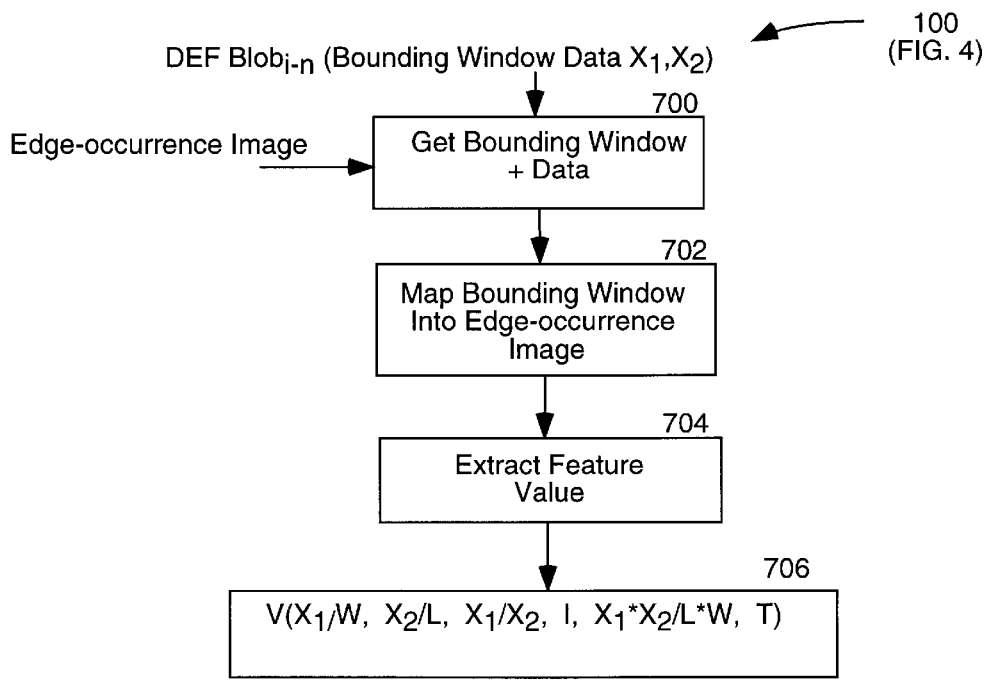
FIG. 19 is a logic flow diagram that illustrates a process for identifying one or more candidate areas within the input image having decimated-image characteristics and edge-occurrence image characteristics corresponding to the characteristics of interest.

In routine 100, the multi-resolution label locator program 36 combines the segmented image 56 and the edge-occurrence image 58 to form the compound image 60 of FIG. 8. The multi-resolution label locator program 36 then extracts feature values from the compound image 60. Further details of routine 100 are shown in FIG. 19.

Figure 20:
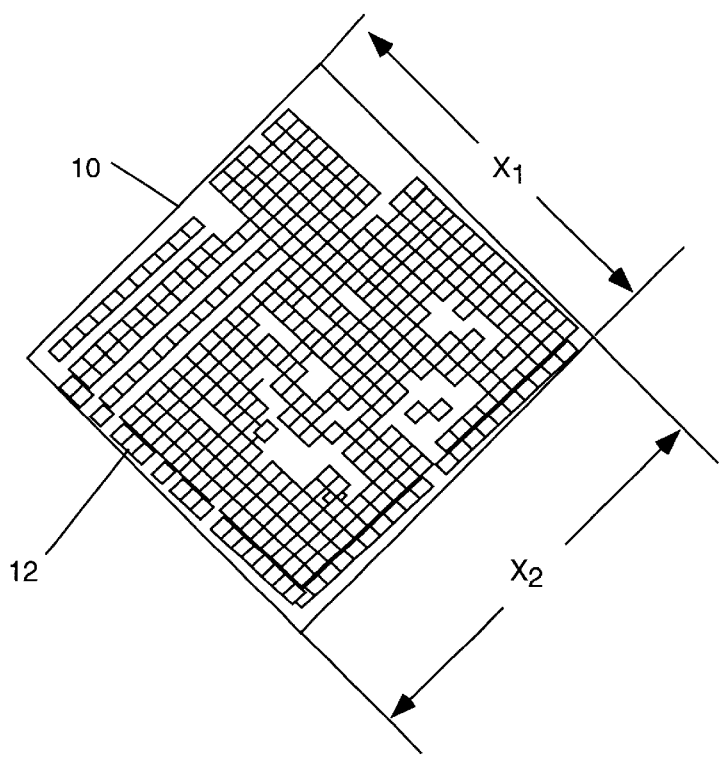
FIG. 20 is diagram illustrating a bounding window formed around each connected component within the segmented image.

In routine 102, the multi-resolution label locator program 36 pre-classifies label candidates according to predefined criteria of expected bounding window feature values of label candidate areas. One of the criteria includes the length and width of a label candidate area, as illustrated in FIG. 20. Further details of the pre-classification process according to the predefined criteria in routine 102 will be described with reference to FIG. 21 below.

In routine 104, the multi-resolution label locator program 36 classifies label candidate areas according to another set of pre-defined criteria, referenced to generally as feature values which include feature values other than bounding window feature values and bounding window feature values. Further details of routine 104 will be described with reference to FIG. 22 below.

In routine 106, the multi-resolution label locator program 36 outputs a predetermined number of label candidates or compiles a prioritized list of one or more candidate areas that most likely contain indicia having characteristics of interest.

For example, if handwritten destination address labels are sought, the multi-resolution label locator program 36 would produce a prioritized list of candidate areas that would most likely contain handwritten destination address labels corresponding to the objects in the original high resolution image produced by the CCD camera 26.

Images Generated by Multi-resolution Label Locator

FIG. 5 illustrates the decimated-image 54 of the surface of parcel 24$a$. The decimated-image 54 has a much lower resolution compared to the original high resolution digital image 48 of FIG. 2. In this particular example of the multi-resolution label locator, the decimated-image 54 includes a plurality of label candidate areas 25A, 40A, 42A, 44A, and 46A. These label candidate areas correspond to the address labels 40 & 42, barcode 44, extraneous markings 25, and postage franking mark 46 of FIG. 2. The pixels in decimated-image 54 represent the mode (i.e. the most frequently occurring pixel value within a corresponding cell) of a corresponding region of pixels in the high resolution image 48 of FIG. 2. Therefore, the decimated image 54 preserves any abrupt color transitions present in the original high resolution digital image 48.

After processing of the decimated image 54, the decimated-image circuit 52 produces the segmented image 56. The segmented image includes a plurality of connected components 25B, 40B, 42B, 44B, and 46B. These connected components correspond to the label candidate areas 25A, 40A, 42A, 44A, and 46A of the decimated-image-image 54. The segmented image 56 further includes bounding windows 25C, 40C, 42C, 44C, and 46C. These bounding windows correspond to the outline or perimeters of the connected components 25B, 40B, 42B, 44B, and 46B. The method for generating the connected components and bounding windows will be discussed in further detail in the description of operation of the preferred apparatus with reference to the logic flow diagrams, of FIGS. 12–23.

While the multi-resolution label locator system generates the decimated image 54, the system also simultaneously produces the edge-occurrence image 58 as illustrated in FIG. 7. The edge-occurrence image 58 includes a plurality of second set of label candidate areas 25D, 40D, 42D, 44D, and 46D. The second set of label candidate areas also corresponds to the address labels 40 and 42, barcode 44, extraneous markings 25, and the postage franking mark 46 of the original high resolution digital video image 48 of FIG. 2. In this particular application of the multi-resolution locator system, the edge-occurrence image circuit 50 creates the edge-occurrence image 58 by assigning pixel colors proportional to the evenness of the distribution of edge orientations within corresponding regions of pixels in the high resolution digital video image 48. That is, a high number of randomly oriented transitions results in a high edge-occurrence value, while a low number of transitions or a high number of commonly oriented transitions results in a low edge-occurrence value.

When the multi-resolution label locator has completed processing for both the edge-occurrence and segmented images 56 and 58, the system then creates the compound image 60 of FIG. 8 where data from the segmented image 56 is combined with the edge-occurrence image 58. The bounding windows 25C, 40C, 42C, 44C, and 46C of the segmented image 56 are mapped around the second set label candidate areas 25D, 40D, 42D, 44D, and 46D of the edge-occurrence image 58. More specifically, from the compound image 60, the host computer or microprocessor 34 controlled by the multi-resolution label locator program 36 extracts bounding window feature values and feature values corresponding to the feature values for cells within each bounding window. The host computer or microprocessor 34 under the guide of the multi-resolution label locator program 36 classifies the label candidate areas 25D, 40D, 42D, 44D, and 46D in accordance with the bounding window feature values and the feature values of the label candidate areas generated by the edge-occurrence circuit 50.

Description of a Preferred Apparatus

As described above, the preferred embodiments of the present invention to provide an efficient method for determining the location of address labels. However, other applications of the multi-resolution locator system are within the scope of the present invention.

Figure 9:
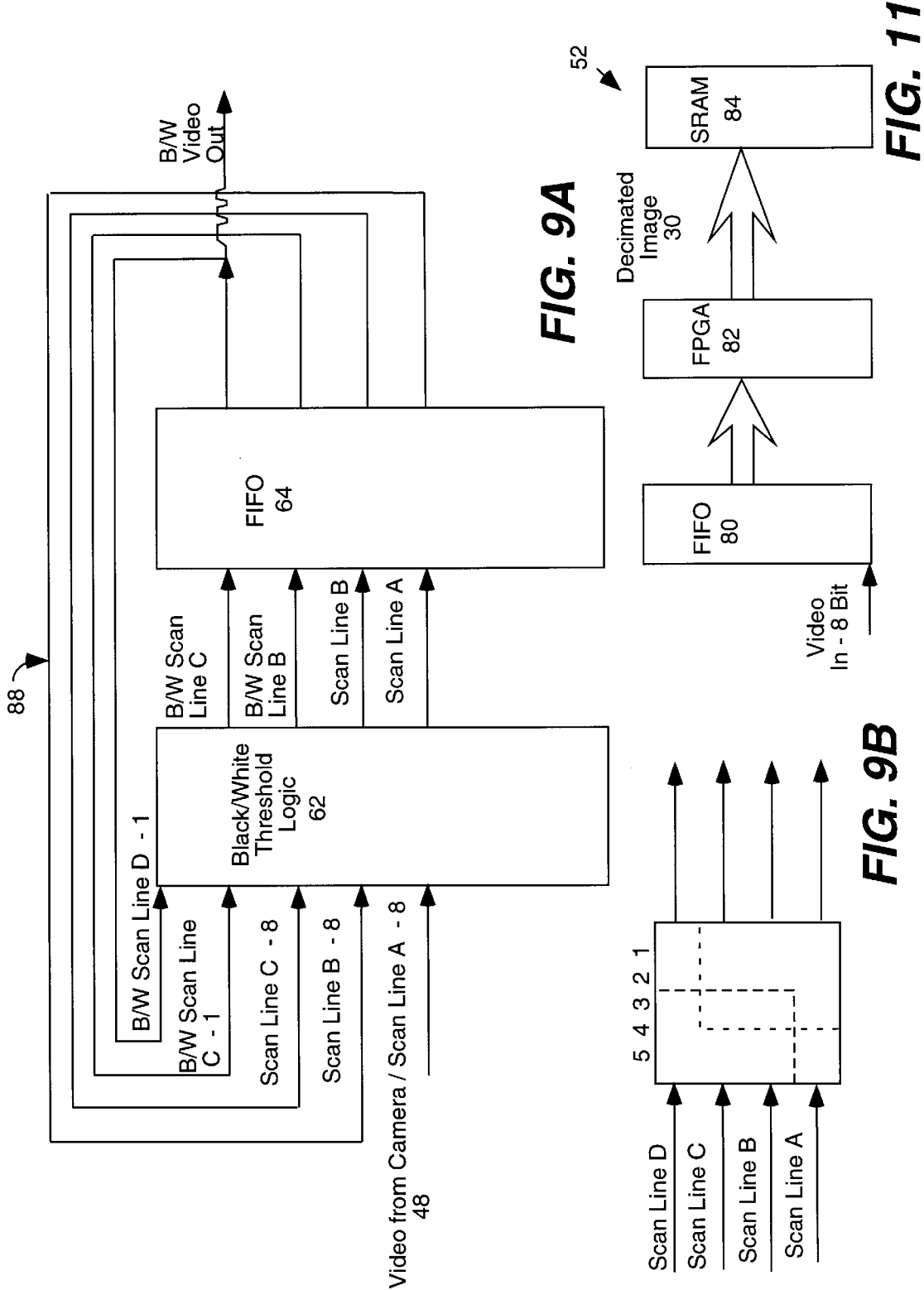
FIG. 9A is a functional block diagram of the hardware for thresholding the original high resolution image generated from the camera into a black/white binary image.
FIG. 9B is a diagram describing the black and white threshold logic for the black/white binary image hardware of FIG. 9A.

To implement the method of the present invention, FIG. 9A shows a functional block diagram illustrating the hardware for binarizing the gray-scale image step 88 of the method, which is part of the edge-occurrence image circuit 50. The hardware 88 of the edge-occurrence image circuit 50 includes a black/white threshold logic circuit 62 that is operatively linked to a buffer memory 64. The buffer memory 64 may be a conventional first-end-first-out (FIFO) buffer constructed from commercially available chips such as an 8k by 18 bit model IDT-72255L20PF chips manufactured by IDT corporation. The buffer memory 64 may alternatively be implemented by a controller and a static RAM memory resource. The hardware 88 of the edge-occurrence image circuit 50 thresholds the original high resolution digital video image 48 from the CCD camera 26 into a black/white binary image.

The binarizing hardware 88 uses standard thresholding techniques or a similar process to convert the analog signal produced by the CCD camera 26 into a one-bit black/white digital video signal 67. The use of a one-bit black/white digital video signal 67 provides for easier processing of the video signal 67 by the edge-occurrence image circuit 50.

As illustrated in FIG. 9B, the binarizing hardware 88 operates according to the logic set forth in Table 3 having variables defined by a 5 by 4 pixel window. The binarizing hardware 88 determines a pixel value according to its neighboring pixels' values in a field of pixels. In other words, the binarizing hardware 88 separates foreground image information from background image information by comparing relative color intensity or light intensity values between pixels within an image. The variables of Table 3 are defined by the pixel window shown in FIG. 9B as follows: B2 refers to the grayscale value of Scanline B; Position 2 BWC4 refers to the black/white value of Scanline C at position 4. The remaining variables of Table 3 are defined similarly.

TABLE 3

(Exemplary Black/White Threshold Logic Based on FIG. 9B)

F = Max (|B2-A1|, |B2-A2|, |B2-A3|, |B2-B1|, |B2-B3|, |B2-C1|, |B2-C2|, |B2-C3|)
S = element of {A1, A2, A3, B1, B3, C1, C2, C3} for which |B2-S| = F
If (F> Noise Threshold)
    If (B2> S)
        BWB2 = White
    Else
        BWB2 = Black
Else TABLE 3-continued (Exemplary Black/White Threshold Logic Based on FIG. 9B)

If (BWB3=Black AND BWC1 = Black AND BWC2 = Black
AND BWC3 = Black)
    BWB2 = Black
Else
    BWB2 = White Table 4 provides logic for speckle or noise removal based upon the variables defined by the pixel window illustrated in FIG. 9B.

TABLE 4

(Single Black Pixel "Speckle" Removal Based on FIG. 9B)

If (BWB3 = White AND BWB4 = White AND BWB5 = White AND
BWC3 = White AND BWC5 = White AND BWD3 = White AND
BWD4 = White and BWD5 = White)
    BWC3 = White
Else
    BWC3 = BWC3

Figure 10:
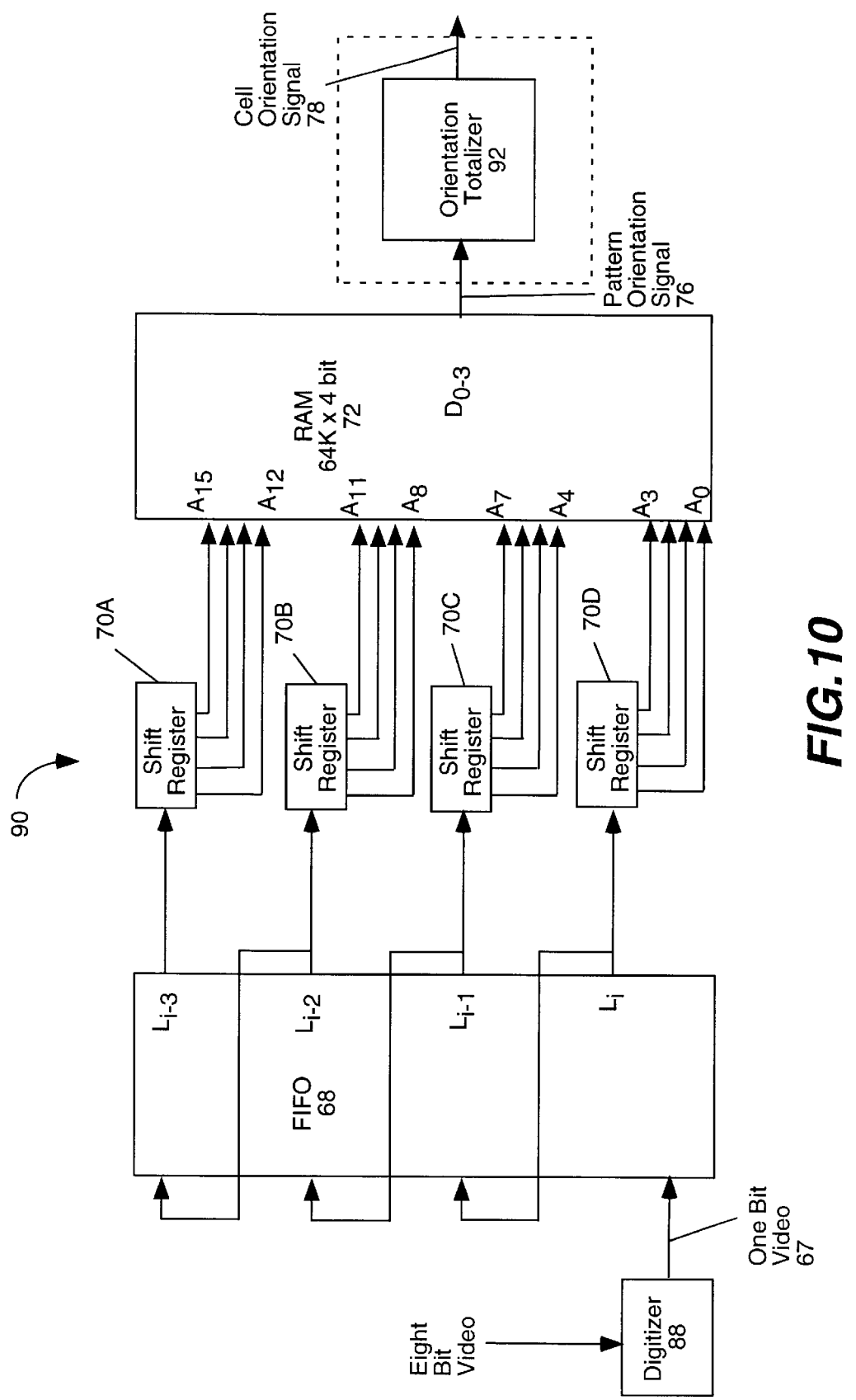
FIG. 10 is a functional block diagram illustrating the hardware for producing the edge-occurrence image.

After the binarizing hardware 88 generates the one-bit black and white video signal, hardware corresponding to routine 90 of FIG. 4 processes the black and white video signal. FIG. 10 illustrates hardware for routine 90 of the edge-occurrence image circuit 50. The hardware 90 of the edge-occurrence circuit 50 includes the digitizer 88, buffer memory 68, shift registers 70A–70D, volatile memory 72, and an orientation totalizer 74. The binarizing hardware or digitizer 88, as noted above, converts the analog gray-scale video signal into a digital one-bit video signal 67.

The binarizing hardware 88 transmits the one-bit digital video signal 67 to buffer memory 68. The buffer memory 68 includes data lines $L_i$ through $L_{i-3}$ wherein each data line accesses a shift register including 4,096 bits—one-bit corresponding to each pixel of the CCD camera 26. Each register may therefore contain a bit map representation of one scan line of the image 30 produced by one cycle of the CCD camera 26. The lines $L_i$ through $L_{i-3}$ of the buffer memory 68 correspond to the 32 pixel height of the 32×32 of each cell (not shown).

As shown in FIG. 10, each data line $L_i$ through $L_{i-3}$ is connected to the next succeeding data line so that each time a new scan line is read into the buffer memory 68, the preceding scan lines each shift to the succeeding register. The buffer memory 68 may be a conventional first-end-first-out (FIFO) buffer constructed from commercially available chips such 4k by 18-bit model IDT-72245LB20PF chips manufactured by the IDT Corporation. The buffer memory 68 may alternatively be implemented by a controller in a static RAM (SRAM) memory source.

The data lines $L_i$ through $L_{i-3}$ of the buffer memory 68 are connected to a plurality of shift registers 70A–70D. The shift register 70A–70D provide pixel information to volatile memory 72. The volatile memory 72 may be a conventional random access memory (RAM) chip constructed from commercially available chips such as the 64k by 4-bit model IDT-61298SA12Y manufactured by IDT Corporation. The volatile memory 72 generates a pattern orientation signal 76.

The volatile memory 72 feeds the pattern orientation signal 76 into the orientation totalizer 92. The orientation totalizer 92 generates a cell orientation signal 78. The operation of the buffer memory 68, shift registers 70A–70D, and volatile memory 72 is described below with more particularity with respect to FIG. 12. The operation of the orientation totalizer 74 is described below with more particularity with respect to FIG. 13.

While the binarizing hardware 88 generates the edge-occurrence image 58 of FIG. 7, the hardware 52 of FIG. 11 generates the decimated image 54. The decimated-image circuit 52 preferably includes a buffer memory 80, a field programmable gate array 82, and an SRAM 84. The buffer memory 80 may be a conventional first-end-first-out (FIFO) buffer constructed from commercially available chips such as a 4k by 18-bit model IDT-72245LB20PF FIFO Chip manufactured by IDT Corporation. The field programmable gate array 82 may be a conventional FPGA chip such as the EPM7256SRC208-7 FPGA chip manufactured by Altera Corporation. The SRAM chip 84 may be a 64k by 16-bit model IDT-71V016SA10PH SRAM chip manufactured by the IDT Corporation.

The FIFO 80 and FPGA 82 generate the decimated-image signal 30 for the multi-resolution label locator system 20. The operation of the decimated-image feature circuit 52 is described with more particularity with respect to FIGS. 14 and 15.

Description of Operation of the Preferred Apparatus With Reference to the Logic Flow Diagrams The logic flow diagrams described below illustrate the methodology of the edge-occurrence circuit 50, the decimated-image circuit 52, and the multi-resolution label locator program 36 of FIG. 4 with more particularity. The logic flow diagram of FIG. 4 corresponds to FIG. 1 of the entire multi-resolution label locator system 20. The logic flow diagrams of FIGS. 12 and 13 correspond to the black/white threshold logic 62, FIFO 64, FIFO 68, shift registers 70A–70D, RAM 72, and the orientation totalizers 74 of FIGS. 9A, 9B, and 10. The logic flow diagrams of FIGS. 14 and 15 correspond to FIFO 80, FPGA 82, and SRAM 84 of FIG. 11. The logic flow diagrams of FIGS. 18, 19, 21, and 22 correspond to the multi-resolution label locator program 36 as shown in FIG. 1.

The logic flow diagrams illustrate a preferred method for implementing the present invention while it is noted that many changes and variations may be made to the illustrated method within the scope and spirit of the present invention. It will also be appreciated that the logic flow diagrams define an allocation of programming tasks among the preferred apparatus described above. Many different allocations of programming tasks among various chips and many different allocations of programming tasks among different FPGA chip configurations, may be similarly defined within the scope and spirit of the present invention.

Edge-occurrence Image Processing

Figure 12:
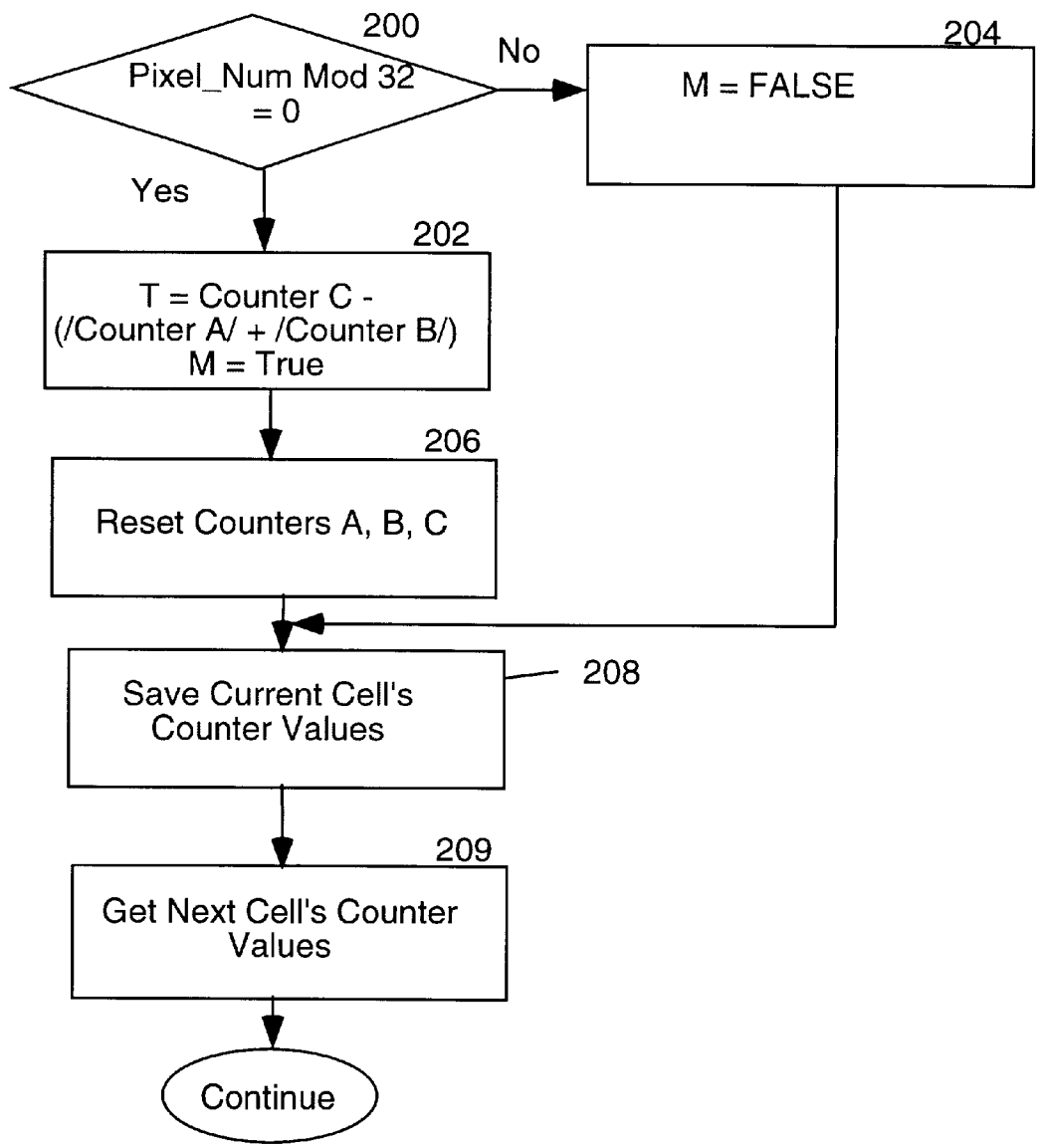
FIG. 12 is a logic flow diagram illustrating a process for identifying transitions in expected orientations among binarized pixel values within the cell of an edge-occurrence image.

FIG. 12 is a logic flow diagram of a computer implemented process for routine 90 (detect presence & orientations of edges) of FIG. 4. FIG. 12 also illustrates the computer implemented process for the FIFO 68, shift registers 70–70D, and RAM 72 of FIG. 10. FIG. 12 also corresponds to the initial steps in creating the edge-occurrence image 54 illustrated in FIG. 5.

Routine 90 begins at step 200, in which the logic expression "pixel_NUM MOD 32=0" toggles from yes to no every multiple of 32, i.e., at 32, 64, 96, 128, etc. This operation corresponds to dividing the 4,096 pixels of a scan line into partial scan lines each having a width of 32 pixels. If the answer to the inquiry of decision step 200 is yes, the "yes" branch is followed to step 202. If the answer to the inquiry of decision step 200 is no, the "no" branch is followed to step 204.

In step 202, a totalized edge-occurrence value T is defined by a mathematical relationship between counters A, B, and C. Each cell of the binarized image is assigned the three counters A, B, and C. These counters define the relative orientation of edges within a respective cell. In step 202, the dominate feature image circuit 50 filters out information based upon the totalized edge-occurrence value T. For example, since counters A, B, and C for each cell represent the relative orientation of edges within a cell then for certain edges such as barcodes, the edge-occurrence image circuit 50 can filter barcodes out due to the common orientation of the transitions. This filtering is not limited to the label environment of the preferred embodiment. For example, in a circuit board identification application for the present invention, lead lines or markings (edges) on chips having pre-defined orientations may be accounted for in the filtering equation.

In step 206, the counters A, B, and C are reset. In step 208, the edge-occurrence image circuit 50 saves the current cells counter values. In step 209, the edge-occurrence image circuit 50 moves to the next cell's counter values.

When the logical expression "pixel NUM_MOD 32" in step 200 does not equal 0, the "no" branch is followed to step 204 where the variable M is set to false. The variable M is a flag used to designate the result of the logical expression in step 200.

Figure 13:
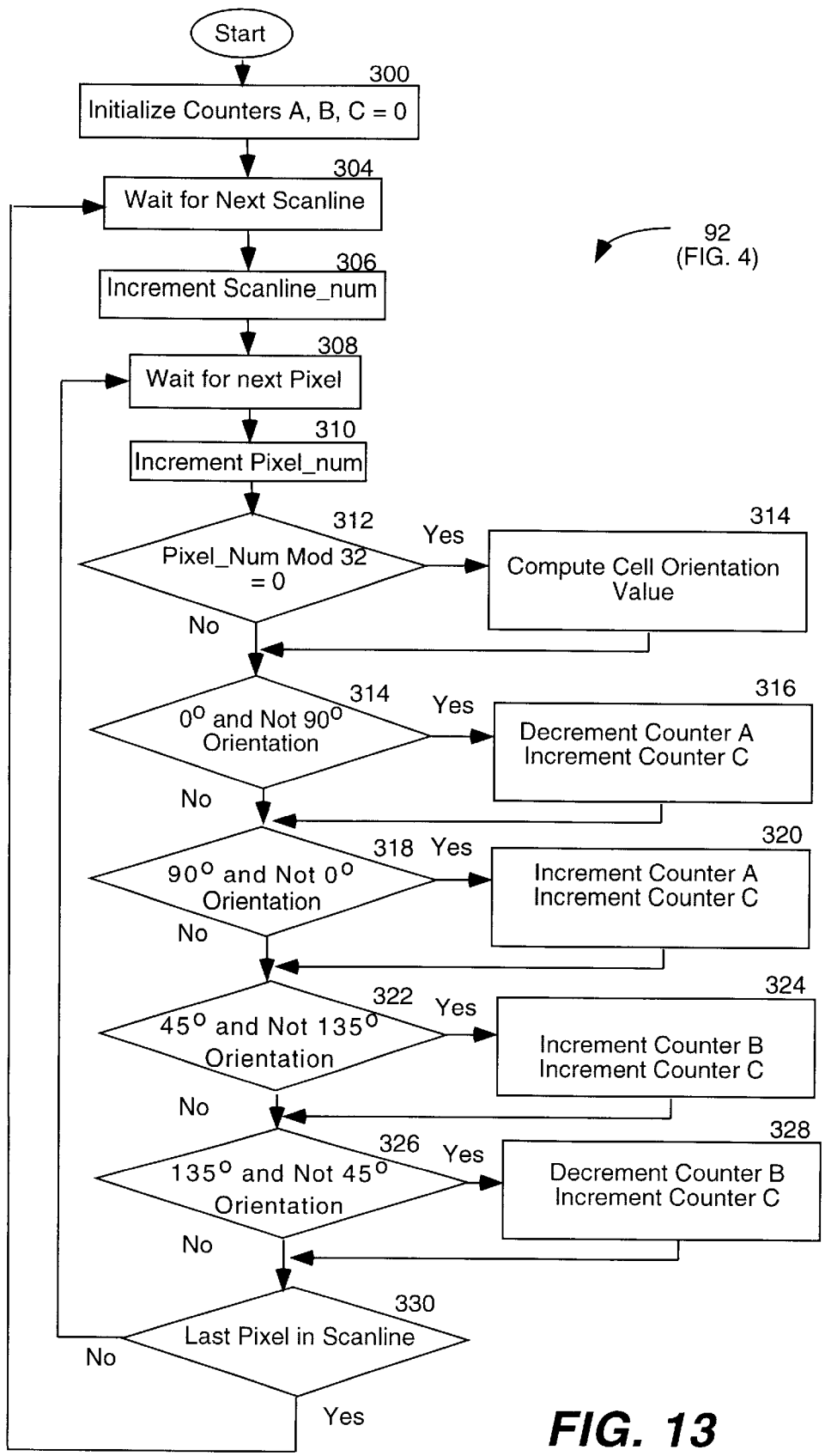
FIG. 13 is a logic flow diagram illustrating a process for computing a totalized edge-occurrence value for a cell based on the transitions within the edge-occurrence image.

Following the operation of detecting the presence and orientation of edges in FIG. 12, the number of edges are totalized according to routine 92 of FIG. 4, which is further explained by FIG. 13. FIG. 13 illustrates the computer implemented process for the orientation totalizer 74 of FIG. 10. Routine 92 is performed after comparing the cells of the binarized image to the templates of a 4 by 4 look-up table.

Routine 92 begins in step 300, in which the counters A, B, and C, representing the relative orientations of edges within each cell, are initialized to zero. In step 304, the totalizer 74 waits for the next scan line. In step 306, the scan line counter Scan line_NUM is incremented by one. The scan line counter for the totalizer 74 Scan line_NUM counts 1 through 32 and then rolls over, corresponding to the division of the input image into cells having a height of 32 pixels.

In step 308, the totalizer waits for next pixel. In step 310, the pixel counter pixel_NUM is incremented. Step 310 is followed by decision step 312, in which it is determined whether the pixel_NUM MOD 32 condition is met.

If the answer to the inquiry of step 312 is true, the "yes" branch is followed to step 314 in which the totalizer 74 computes the orientation value of a cell. If the answer to the inquiry of step 312 is false, the "no" branch is followed from step 312 to step 314, in which the totalizer 74 determines whether the cell orientation value for the current pixel is equal to zero (0) degrees and not ninety (90) degrees.

If the answer to the inquiry to step 314 is yes, the "yes" branch is followed to step 316, in the totalizer 74 decrements counter A while incrementing counter C. If the answer to the inquiry of step 314 is no, the "no" branch is followed to step 318.

In step 318, it is determined whether the cell orientation value is equal to ninety (90) degrees and not zero (0) degrees. If the inquiry to step 318 is yes, the "yes" branch is followed to step 320 in which the totalizer 74 increments counters A and C. If the answer to the inquiry of step 318 is no, the "no" branch is followed to step 322, in which it is determined whether the cell orientation value is equal to forty-five (45) degrees and not one-hundred-thirty five (135) degrees.

If the inquiry of step 322 is yes, the "yes" branch is followed to step 324, in which the totalizer 74 increments both counters B and C. If the inquiry to step 322 is no, the "no" branch is followed to step 326, in which it is determined whether the cell orientation value is equal to one-hundred-thirty-five (135) degrees and not forty-five (45) degrees. The cell orientation values of the present invention are not limited to those values enumerated in routine 92. Other values are dependent on the particular application for the multi-resolution system.

Continuing with routine 92, if the inquiry to step 326 is yes, the "yes" branch is followed to step 328, in which counter B is decreased while counter C is incremented. If the inquiry to step 326 is no, the "no" branch is followed to step 330, in which it is determined whether the current pixel is the last pixel in the scan line.

If the current pixel is not the last pixel in this scan line, the "no" branch is followed from step 330 to step 308 in which totalizer 74 waits for the next pixel. If the current pixel is the last pixel in the scan line, the "yes" branch is followed from step 330 to step 304 in which the totalizer 74 waits for the next scan line. After processing the data in accordance with the steps outlined above, the multi-resolution label locator system generates the edge-occurrence image 58 as illustrated in FIG. 7.

Decimated-image Processing

Figure 14:
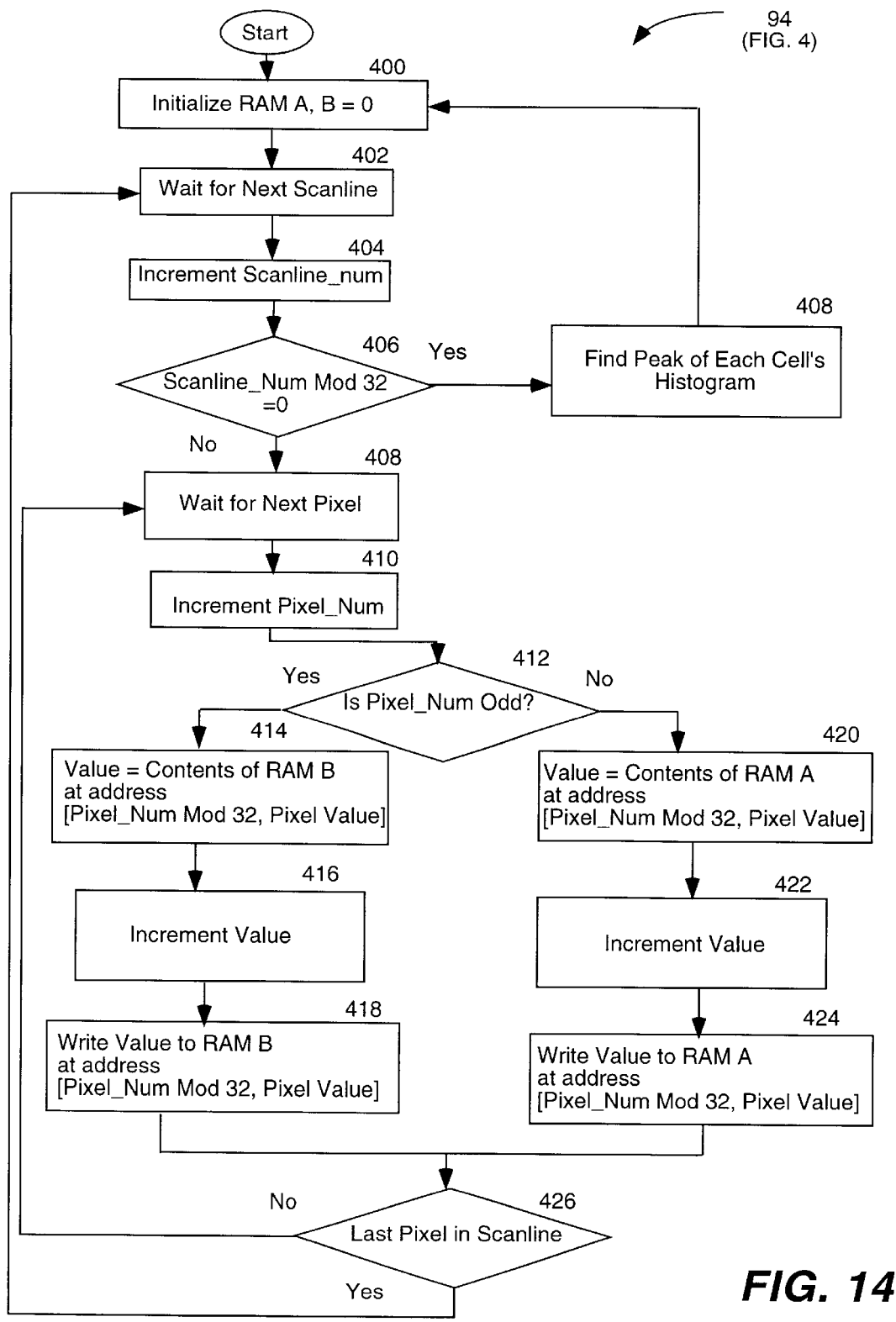
FIG. 14 is a logic flow diagram illustrating a process for creating the decimated image by computing a histogram of pixel values occurring within each cell of the decimated image.
Figure 15:
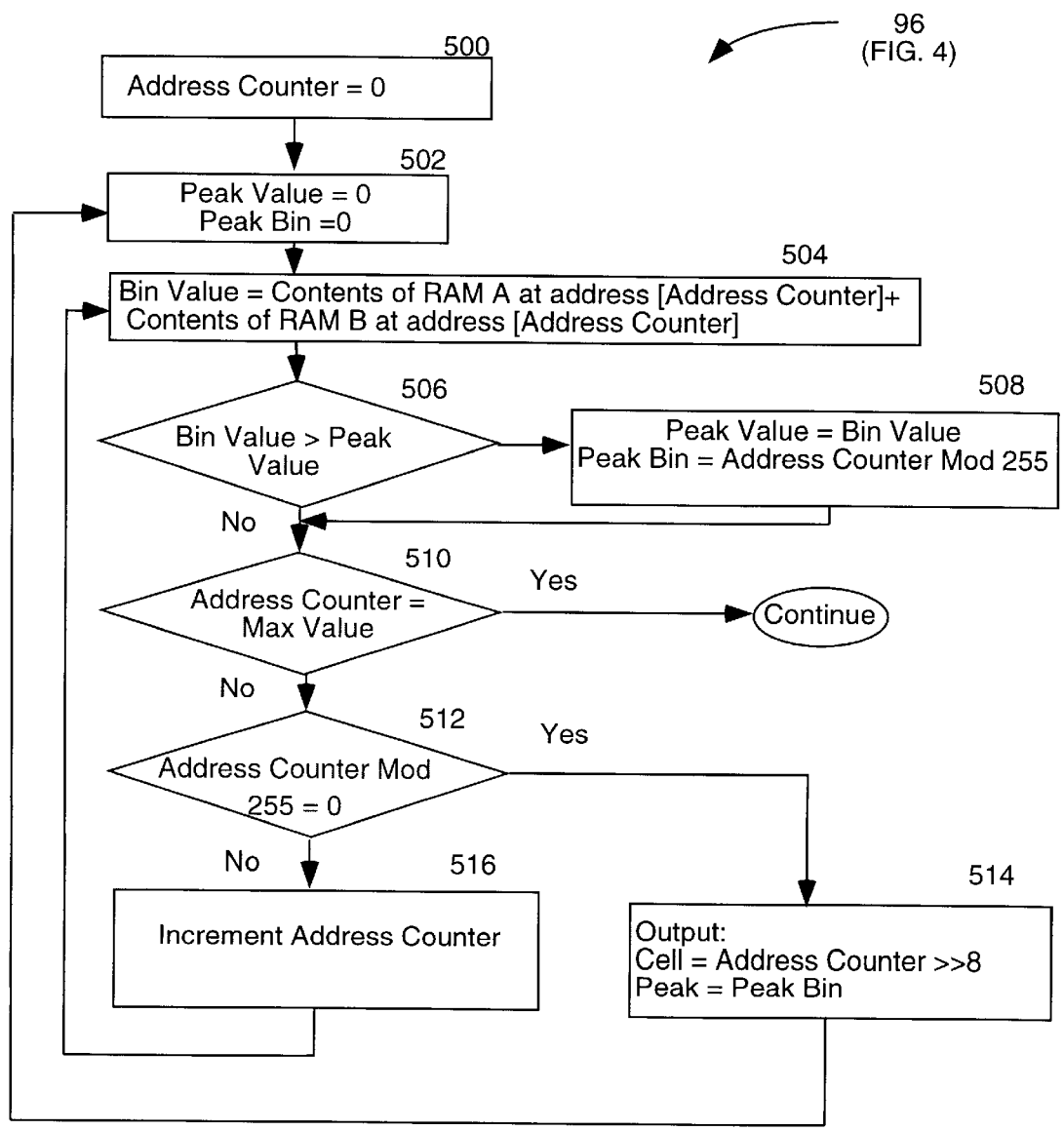
FIG. 15 is a logic flow diagram illustrating a process for finding the peaks in each cells histogram of the decimated image.
Figure 16:
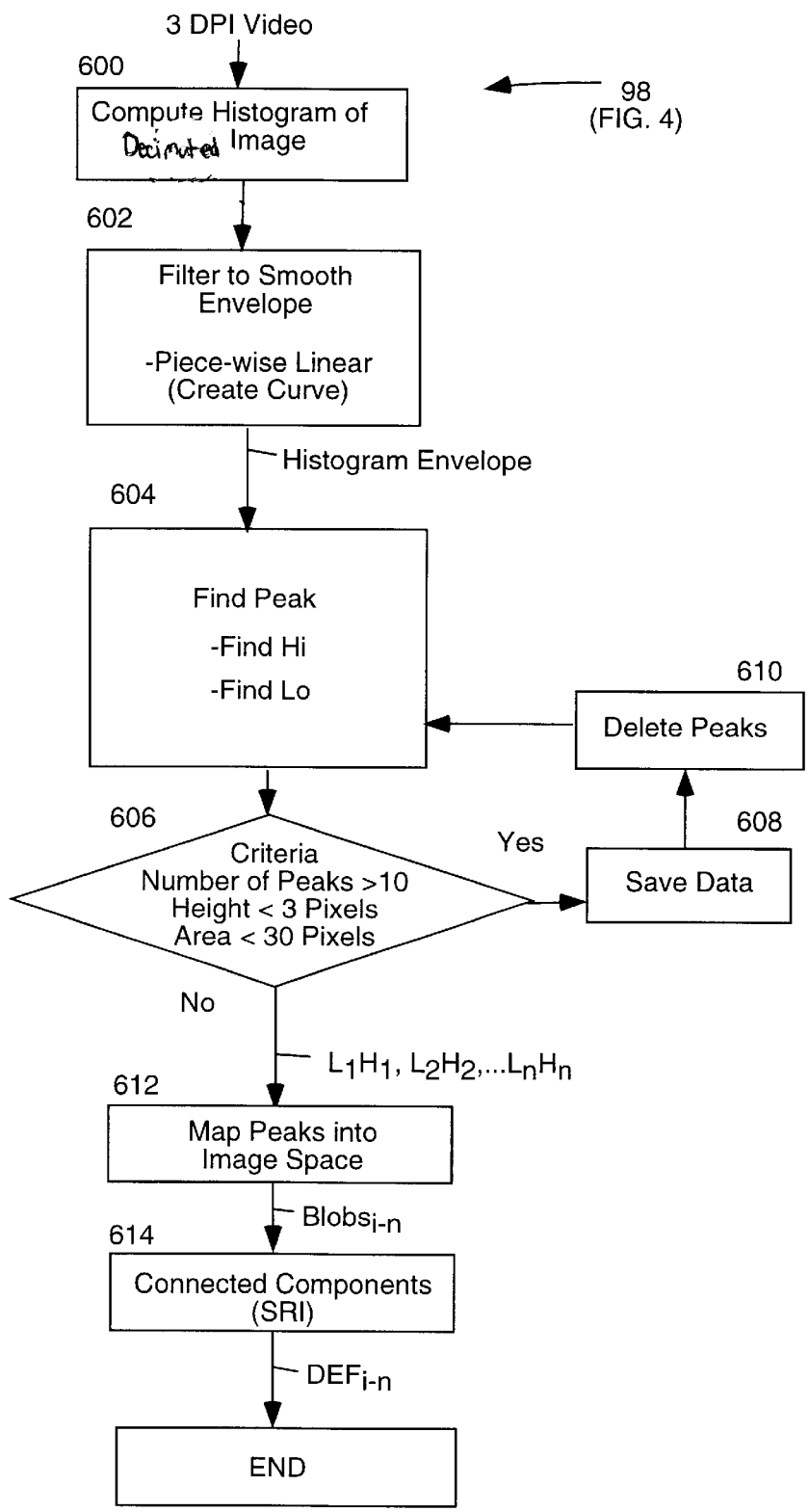
FIG. 16 is logic flow diagram that illustrates a process for identifying one or more candidate areas within the decimated image having characteristics corresponding to the expected characteristics of the indicia on the substrate.

While the multi-resolution label locator system executes the steps of routines 88–92 for edge-occurrence image processing, the multi-resolution label locator system simultaneously executes steps of routines 94–98 illustrated in FIGS. 14–16 to produce the decimated image 54 of FIG. 5. FIG. 14 is a logic flow diagram of a computer implemented process for routine 94 of the decimated-image circuit 52 of FIG. 4.

Routine 94 begins in step 400 of FIG. 4, in which RAMs A and B are set equal to zero. In step 402 the decimated-image circuit 52 waits for the next scan line. In step 404 the scan line counter Scan line_NUM is incremented by one. The scan line counter Scan line_NUM counts 1 through 32.

In step 406, it is determined whether the condition Scan line_NUM MOD 32 equals 0 is met. Those skilled in the art will appreciate that the logical expression "Scan line_NUM MOD 32=0" toggles from false to true every multiple of 32, i.e., at 32, 64, 96, 128, etc. This operation effectively divides the input image into cells having a height of 32 pixels.

If the answer to inquiry of step 406 is yes, the "yes" branch is followed to step 408, in which the peak of each cells histogram is determined. If the answer to the inquiry of step 406 is no, the "no" branch is followed to step 408, in which the decimated-image circuit 52 waits for the next pixel.

In step 410, the pixel counter pixel_NUM is incremented. In step 412, it is determined whether the pixel_NUM counter value is odd. If the inquiry to step 412 is yes, the "yes" branch is followed to step 414 in which a variable VALUE is set equal to the contents of RAM B at the address: pixel_NUM MOD 32, pixel value. In step 416, the variable VALUE is incremented. In step 418, the variable VALUE is written to RAM B at address: pixel_NUM MOD 32, pixel value.

If the inquiry to step 412 is no, the "no" branch is followed to step 420 in which the variable VALUE is set equal to the contents of RAM A at address: pixel_NUM MOD 32, pixel value. In step 422, the variable VALUE is incremented by one. In step 424, the variable VALUE is written to RAM A at address: pixel_NUM MOD 32, pixel value.

In step 426, it is determined whether the current pixel value is the last pixel value in the scan line. If the current pixel is not the pixel in the scan line, the "no" branch is followed from step 426 to step 408 in which the decimated-image circuit 52 waits for the next pixel. If the current pixel is the last pixel in the scan line, the "yes" branch is followed from step 426 to step 402 in which the decimated-image circuit 52 waits for the next scan line.

After the steps illustrated in FIG. 14 for routine 94 have been executed, the multi-resolution label locator system continues processing data in accordance with the steps of the select decimated-image routine 92. FIG. 15 illustrates a computer implemented process for the select decimated-image routine 96 of the FIG. 4.

Step 500 is the first step in routine 96. In step 500 of FIG. 15, an address counter is set equal to zero. In step 502, a peak value variable and a peak bin variable are set equal to zero. In step 504, the bin value is set equal to the contents of RAM A at the address [address counter] plus the contents of RAM B at address [address counter].

In decision step 506, the decimated-image circuit 52 determines if the bin value is greater than the peak value. If the inquiry to step 506 is yes, the "yes" branch is followed to step 508 in which the peak value is set equal to the bin value and the peak bin value is set equal to the address counter MOD 255.

If the inquiry to step 506 is no, the "no" branch is followed to decision step 510, in which it is determined whether the address counter is equal to a max value. If the inquiry to the decision step 510 is yes, then the "yes" branch is followed to where the process continues. If the inquiry to step 510 is no, the "no" branch is followed to decision step 512 in which it is determined whether the variable address counter MOD 255 is equal to zero.

If the inquiry to decision step 512 is yes, the "yes" branch is followed to step 514, in which the cell value is set equal to the address counter and the peak value is set equal to the peak bin value. From step 514, the decimated-image circuit 52 goes to step 502.

If the inquiry to the decision step 512 is no, the "no" branch is followed to step 516 in which the address is counter is incremented by one. From step 516, the decimated-image circuit 52 proceeds back to step 504. After processing the data in accordance with the steps outlined above, the multi-resolution label locator system generates the decimated image 54 as illustrated in FIG. 5.

Segmented image Processing

FIG. 16 illustrates the computer implemented process for routine 98 of FIG. 4, which generates the segmented image 56 of FIG. 6. Routine 98 begins in step 600 of FIG. 16, in which the multi-resolution label locator program 36 computes a histogram of the decimated image 54 of FIG. 5.

Following step 600, in step 602, the multi-resolution label locator program 36 connects peaks of the histogram in a piece-wise linear fashion to create a curve. The multi-resolution label locator program performs two stages of filtering in step 602: first, the multi-resolution label locator program 36 filters the histogram computed in step 600 by utilizing a low-pass filter. The low-pass filter includes the application of seven (7) pixel moving window or envelope to remove low energy oscillations and to smooth the histogram computed in step 600. Next, the multi-resolution label locator program 36 applies an adaptive-moving-window filter in the second stage to further process the filtered data.

Figure 17:
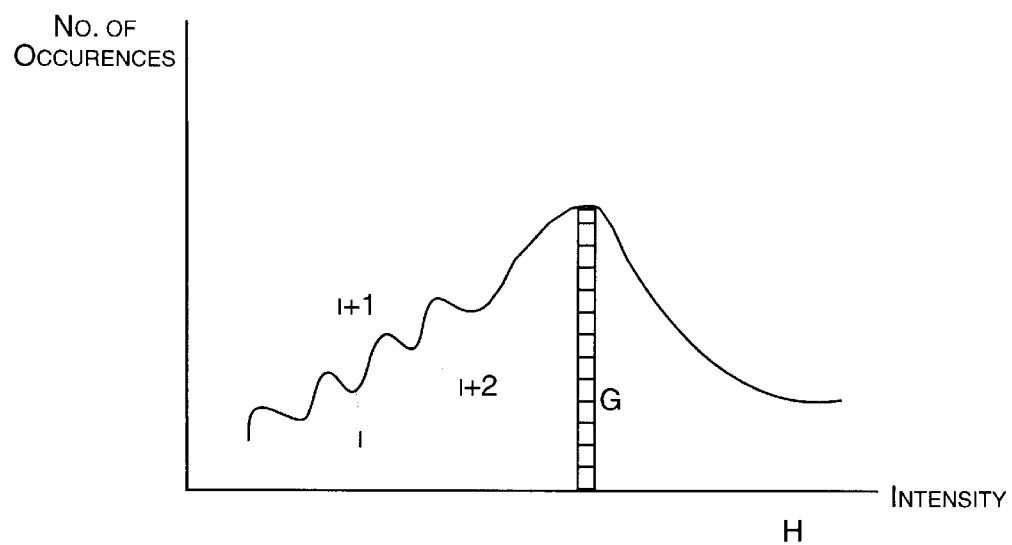
FIG. 17 is a diagram that illustrates a histogram of the decimated image.

FIG. 17 is a graph that demonstrates the smoothing envelope or low pass filter utilized in step 602 of FIG. 16.

The abscissa of the graph for the preferred embodiment represents the light intensity of the pixels for the decimated image 54, while the ordinate represents the number of occurrences/pixels/histograms for a particular light intensity. Other measuring parameters besides light intensity are not beyond the scope of the present invention. For example, a histogram/graph based on color when the multi-resolution locator system employs color imaging could be employed. The multi-resolution label locator program 36 applies the seven (7) pixel moving window or envelope to remove low energy oscillations and to smooth the histogram.

Next, the multi-resolution label locator program 36 employs an adaptive-moving-window-filtering process that includes moving along the curve, from left to right. If the histograms oscillate for every consecutive point, the value of the middle point is equal to the average of two adjacent points. Therefore, $H_{i+1}=0.5\times(h_i+h_{i+2})$ where $H_i$ is the histogram value at point i. This process is a two point moving average that smoothes rough areas of the curve.

Figure 18:
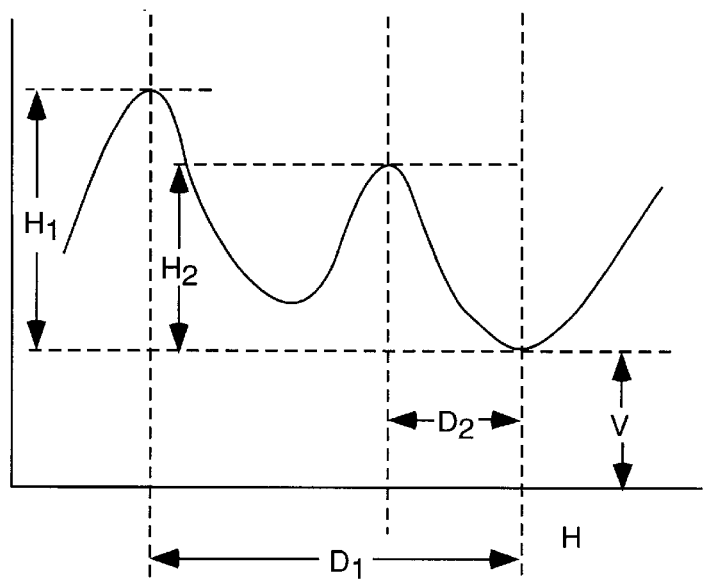
FIG. 18 is a graph that illustrates how peaks of the decimated-image histogram are determined by high and low points.

After the adaptive-moving-window-filtering process is completed, the multi-resolution label locator program 36 continues processing to step 604. In step 604, the multi-resolution label locator program 36 identifies peaks of the filtered histogram as illustrated in FIG. 18. In the example shown, the peaks of the filtered histogram of FIG. 18 correspond to the connected components of the decimated image 54.

As illustrated in FIG. 18, the multi-resolution label locator program 36 searches for each peak in the order from the highest to the lowest peaks. Point H is considered a low point if for down-slope $D_1>12$ and $D_2>10$ and $H_2>20$; or $D_1>5$ and $D_2>2$ and $H_1>20$ and $H_2>8$ and $V<30$; or i=255; or $h_i=-1$ (where $h_i$ is the histogram value at pixel value i). Point H is considered a low point if for up-slope $H_1>12$ and $V<5$; or $H_1>10$ and $D_1>20$ and $V<10$; or i=255; or $H_1=-1$; or $H_1>80$ and $D_1>1$ and $V<8$; or $H_1>5$ and $D_1>5$ and $V<2$.

In decision step 606, the multi-resolution label locator program 36 determines whether the number of peaks for a region is greater than 10, if the height of the region is less than three (3) pixels, or if the area is less than thirty (30) pixels. These values for the number of peaks, height, and area are dependent on the application of the multi-resolution locator system. In other words, these values can be modified for the specific size of the features of interest. For example, if the multi-resolution locator searches for a specific sized microchip on a circuit board, the values would be modified for the size of the particular microchip.

If the inquiry of step 606 is yes, then the "yes" branch is followed to step 608, in which this data is saved. In step 610, the peaks are deleted and the multi-resolution label locator program 36 returns to step 604. If the inquiry of step 606 is no, the "no" branch is followed back to step 612.

In step 612, the multi-resolution label locator program 36 creates a segmented image 56 (as illustrated in FIG. 6) by mapping pixels within each peak region of the filtered histogram into a blank image corresponding the decimated image 54. The segmented image will typically display candidate areas or $BLOBS_{i-n}$. In step 614, the multi-resolution label locator program 36 employs a connected component function, such as that available from SRI International, to create connected components 25B, 40B, 42B, 44B, and 46B representing the candidate areas. The SRI function connects regions within the segmented image 56 that have similar pixel intensities. The SRI function further generates bounding windows 25C, 40C, 42C, 44C, and 46C that circumscribe the connected components 25B, 40B, 42B, 44B, and 46B.

Compound Image Processing

After generating the segmented image 56 of FIG. 6 as a result of routine 98 of FIG. 16, the multi-resolution label locator continues with routine 100 of FIG. 19. Routine 100 begins step 700, in which the multi-resolution label locator program 36 combines the bounding windows 25C, 40C, 42C, 44C and 46C of the segmented image 56 with the label candidate areas 25D, 40D, 42D, 44D, and 46D of the edge-occurrence image 58. In step 702, the bounding windows 25C, 40C, 42C, 44C and 46C of FIG. 6 are mapped into the edge-occurrence image 58 of FIG. 7 to generate the compound image 60 of FIG. 8.

In step 704, the multi-resolution label locator program 36 extracts feature values based upon bounding window characteristics. The bounding window feature values include the following: a normalized height representing a ratio of a height defined by the bounding window to a height defined by the segmented image ($X_1/H$ where $X_1$ is the height of the bounding window and H is the height defined by the segemented image 56); a normalized width representing a ratio of width defined by the bounding window to a width defined by the segmented image ($X_2/W$ where $X_2$ is the width of the bounding window and W is the width defined by the segmented image 56); a normalized area representing a ratio of area defined by the bounding window to an area defined by the segmented image ($X_2*X_1/H*W$); and an aspect ratio representing a ratio of the width defined by the bounding window to the height defined by the bounding window. See FIG. 20 for an exemplary length $X_2$ and width $X_1$ of a bounding window 10.

The bounding window 10 of FIG. 20 has been mapped to a segmented image 56 where peak-region-isolation data 12 is contained by the bounding window 10. The aspect ratio for bounding window 10 is calculated as follows: $X_1/X_2$ if $X_1 \geq = X_2$; otherwise $X_2/X_1$ is used.

As noted above, the multi-resolution label locator program 36 extracts feature values based upon bounding window characteristics. However, the feature values can include any one of the following: a normalized feature intensity T representing a ratio of the sum of feature values for cells within the bounding window to a total number of cells within the bounding window; and a normalized edge-occurrence intensity I representing a ratio of the sum of the totalized edge-occurrence values for cells within the bounding window to area defined by the bounding window.

Once the multi-resolution label locator program 36 extracts the feature values based upon bounding window characteristics, the program 36 in step 706 assembles a vector V for each label candidate area. The vector V is based on a plurality of feature values that include ones based upon bounding window characteristics and values not based upon bounding window characteristics such as light intensity. The program 36 utilizes vector V in the pre-classifier routine 102 and classifier routine 104 to determine if a particular label candidate area is likely to contain an actual destination address label.

Preclassifer Routine

Figure 21:
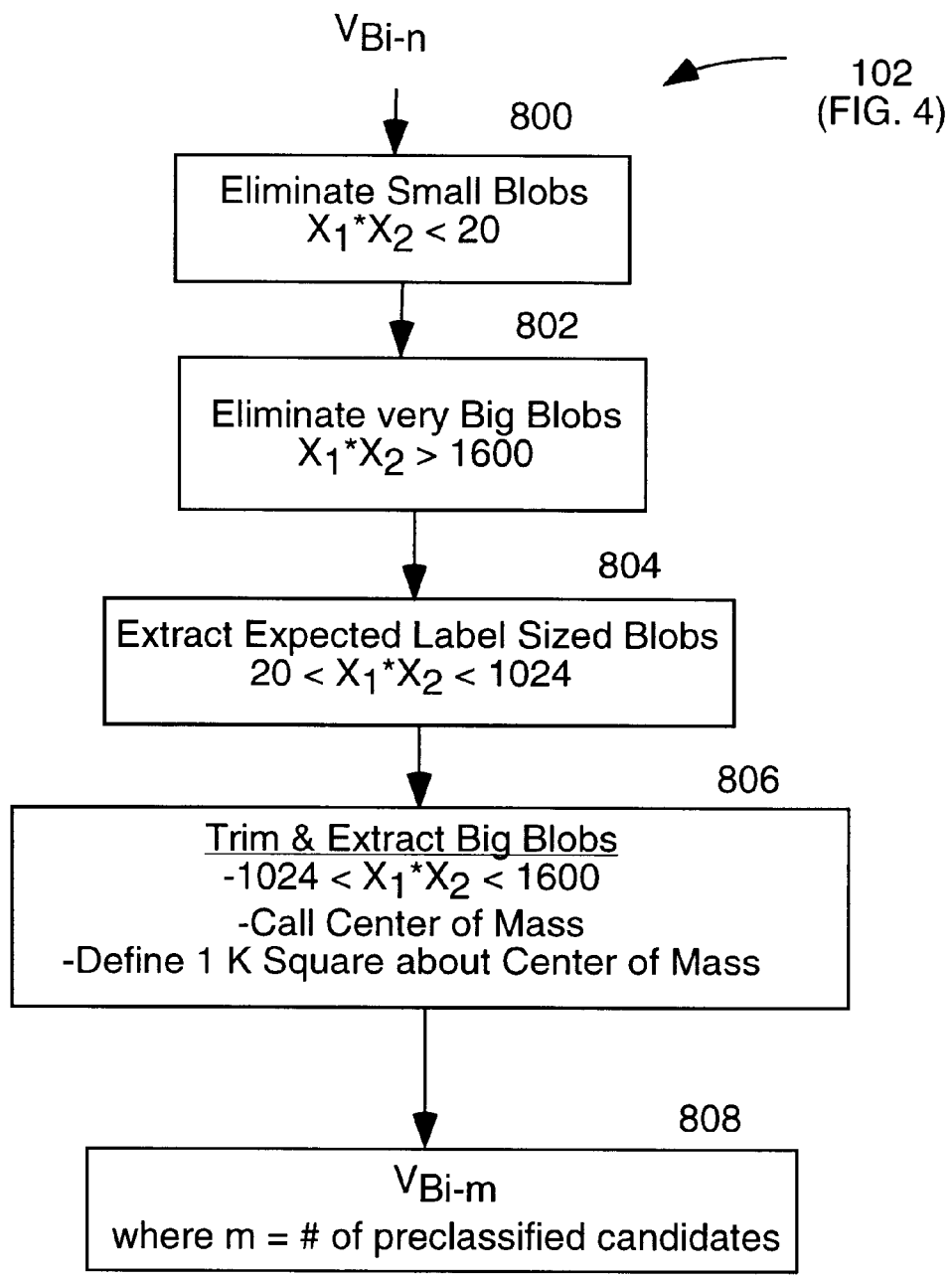
FIG. 21 is a logic flow diagram that illustrates a process for pre-classifying candidate areas by applying a group of qualifications.

FIG. 21 illustrates a computer implemented process for the pre-classifier routine 102 of FIG. 4. Step 800 is the first step of routine 102. In step 800, the multi-resolution label locator program 36 eliminates one or more blobs or label candidate areas having a corresponding bounding window defining an area below a predefined minimum threshold value. The label candidate area is determined by sides having a length $X_1$ and width $X_2$. The multi-resolution label locator program 36 can eliminate candidate areas if such areas fall below a value such as 20. Those skilled in the art will recognize that these threshold values can be varied, based upon the application of the multi-resolution locator system. For example, the multi-resolution label locator system could be designed to identify specific lead lines on a circuit board having a predefined length and width. In such a case, the threshold values would be based upon the length and width of the lead lines of interest.

In step 802, the multi-resolution label locator program 36 eliminates one or more blobs or candidate areas having corresponding bounding window defining an area above a predefined maximum threshold value. For example, the multi-resolution label locator program 36 can eliminate label candidate areas having a value greater than 1,600 since such areas more than likely do not have address labels in view of the dimensions of the image, the pixel spacing, and so forth. Address labels typically have bounding window areas that are less than 1,600 (about 40 square inches in the 3 DPI image of the preferred embodiment).

In step 804, the multi-resolution label locator program 36 can extract expected label sized candidate areas or blobs that have an area that falls between a predefine minimum and maximum value. For example, such a minimum value could be 20 (about 4.5 square inches) while a maximum threshold value could 1,024 (about 32 square inches).

In step 806, the multi-resolution label locator program 36 crops one or more candidate areas or blobs to correspond to a bounding window having a predefined size centered about a center of mass computed for the light intensity feature values of the corresponding candidate area. In step 806, the multi-resolution label locator program 36 calls a center of mass subroutine to cut around a potential candidate area with the highest edge-occurrence density. For the preferred embodiment, the highest edge-occurrence would be the most equal distribution of orientations. The multi-resolution label locator program 36 then proceeds to Output Box 808, in which variable $V_{Bi-m}$ represents the feature vector of a particular blob or potential label candidate area.

Classifying Routine

Figure 22:
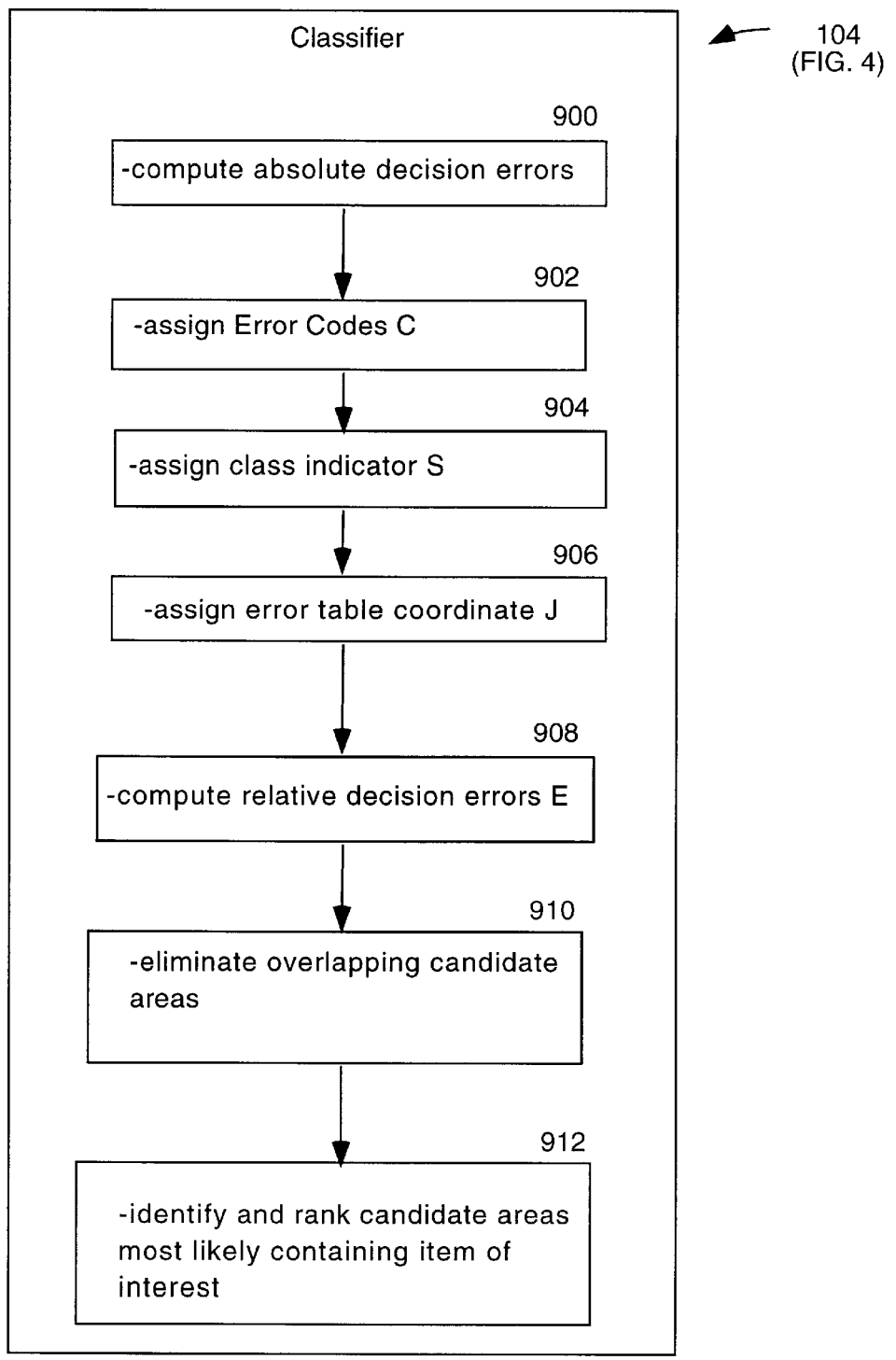
FIG. 22 is a logic flow diagram that illustrates a process for listing candidate areas that have one or more feature vectors.

After completing the preclassifying process illustrated in FIG. 21, the multi-resolution label locator program 36 initiates a classifying routine 104 as illustrated in FIG. 22. Step 900 is the first step in routine 104. In step 900, the multi-resolution label locator program 36 computes absolute decision values or errors corresponding to one or more of the feature values that can be based upon the bounding window characteristics. A bounding window feature value, as mentioned above, may be an aspect ratio of a bounding window. This aspect ratio is then compared to an expected or typical aspect ratio for an expected sized address label.

While the bounding window feature values relate to the dimensions of a label candidate area, other feature value characteristics may relate to the image parameters detectable by a video camera. For example, one feature value can be the normalized edge-occurrence density of a candidate area within the edge-occurrence image 58. This normalized edge-occurrence density is then compared to an expected edge-occurrence density. Another feature value can be a normalized light intensity. This normalized light intensity of a potential candidate area is compared to an expected light intensity of a decimated image 54 of a label.

The absolute decision error values computed in step 900 can be summarized as follows:

Aspect Ratio Absolute Decision Error $e_R$:

$e_R = |X_1/X_2 - R_0|$ where $R_0$ is the expected or typical aspect ratio. For address labels, this value has been determined as 1.5. $X_1/X_2$ is the aspect ratio for a bounding window of a specific blob or label candidate area. (See FIG. 20 for the length and width dimensions $X_1$ and $X_2$ of a bounding window.)

Edge-occurrence Absolute Decision Error $e_T$:

$e_T = |T_i/N - T_0|$ where $T_0$ is the expected edge-occurrence density. For address labels, $T_0$ has been determined as 1.0. $T_i/N$ is the edge-occurrence density for a potential candidate area.

Gray Scale Light Intensity Absolute Decision Error $e_I$:

$e_I = |I_i/N - I_0|$ where $I_0$ is the expected light intensity of the decimated image 54. The expected value of $I_0$ for the label environment is 255. $I_i/N$ is the light intensity of a specific blob or label candidate area.

Normalized Dimension Absolute Decision Error $e_D$:

$e_{D1} = \text{maximum}(|d_1 - 1_1|)$ $e_{D2} = \text{maximum}(|d_2 - 1_2|)$ where $d_1$ and $d_2$ are normalized dimensions of a label candidate area.

$d_1 = X_1/W$ $d_2 = X_2/W$ where $X_1$ and $X_2$ are the length and width dimensions of a bounding window while W is the width of the decimated image 54.

$1_1$ and $1_2$ and are expected normalized dimensions where $1_1 = 20/W$ and $1_2 = 22/W$ if $d_1 < d_2$; or if $d_1 >= d_2$ then $1_1 = 22/W$ and $1_2 = 20/W$.

After computing the absolute decision errors of step 900, then the multi-resolution label locator program 36 continues to step 902. In step 902, the multi-resolution label locator program 36 assigns four error codes ($C_R$, $C_T$, $C_I$, $C_D$) to each label candidate area. Each of the codes ($C_R$, $C_T$, $C_I$, $C_D$,) has a value based upon calculations involving the decision error values in step 900. Those skilled in the art recognize that these error code values can be adjusted depending on the type of application for the multi-resolution locator system. The following are the equations to determine the error codes:

Aspect Ratio Error Code $C_R$:

| $C_R$ | = | 1 | $e_R <= 1.5$ |
|---|---|---|---|
| | | 0 | $1.5 < e_R <= 2.5$ |
| | | -1 | $e_R > 2.5$ |

Edge-occurrence Error Code $C_T$:

| $C_T$ | = | 1 | $e_T <= 0.667$ |
|---|---|---|---|
| | | 0 | $0.667 < e_T <= 0.800$ |
| | | -1 | $e_T > 0.800$ |

Gray Scale Light Intensity Error Code $C_I$:

-continued

| $C_T$ | = | 1 | $e_1 >= I_W$ |
|---|---|---|---|
| | | 0 | $e_1 <= I_B$ |
| | | -1 | $I_B < e_1 < I_W$ where |

$1_B = 0.2 *$ dynamic range and $I_W = 0.5 *$ dynamic range.

Normalized Dimension Error Code $C_D$:

| $C_D$ | = | 1 | $e_{D1} <= 1$ and $e_{D2} <= 1$ |
|---|---|---|---|
| | | 0 | otherwise |
| | | -1 | $e_{D1} >= |X_1 - 24|$ or $e_{D2} >= |X_2 - 24|$ |

After computing the Error Codes of step 902, the multi-resolution label locator program 36 continues to step 904. In step 904, the multi-resolution label locator program 36 assigns a class "S" value to each label candidate area based upon the Error Codes C calculated in step 902. The class "S" value is computed as follows:

| S = | 1 | if $C_R = 1$ and $C_T = 1$ |
|---|---|---|
| | 0 | if $C_R = 0$ and $C_T = 1$ and $C_D = -1$; or |
| | | if $C_R = 1$ and $C_T = 0$ and $C_D = -1$; or |
| | | if $C_R = 1$ and $C_T = -1$ and $C_D = 1$; or |
| | | if $C_I = -1$ and $C_R = 1$ and $C_D = -1$. |
| | -1 | otherwise |

When the multi-resolution label locator program 36 finishes assigning an class "S" value to each label candidate area, it proceeds to step 906. In step 906, each label candidate area is assigned an error table coordinate value J. Each error table coordinate value J is calculated as follows:

| J = | 11 | if $C_R = 1$ and $C_T = 1$; |
|---|---|---|
| | 0 | if $C_R = 0$ and $C_T = 1$ and $C_D = -1$; |
| | 1 | if $C_R = 1$ and $C_T = 0$ and $C_D = -1$; |
| | 2 | if $C_T = -1$ and $C_D = 1$; |
| | 3 | if $C_R = 1$ and $C_D = -1$ and $C_R = 1$; |
| | -1 | otherwise |

After assigning the error table coordinate value J to each label candidate area, the multi-resolution label locator program 36 eliminates label candidate areas that have a class S value equal to -1. Once the program 36 performs the elimination of label candidate areas having a class S value equal to -1, the program 36 proceeds to step 908.

In step 908, the multi-resolution label locator program 36 then computes relative decision errors E for each label candidate area having a class S value equal to 1 or 0 according to the following rules:

Rule (1):

The relative error E for feature vectors V of label candidate areas having a class S value=1 are categorized as smaller than the relative error for the feature vectors V of label candidate areas having a class S value =0;

Rule (2):

The relative error E for a feature vector V of a label candidate area having a class S value=1 is set equal to its Edge-occurrence Absolute Decision Error $e_T$;

Rule (3):

The relative error E for a feature vector V of a label candidate area having a class S value=0 are calculated as follows: The multi-resolution label locator program 36 determines the relative error E of label candidate areas having a class S value=0 by comparing pairs of feature vectors $V_1$, $V_2$ of respective pairs of label candidate areas to determine which one of a pair of label candidate areas has a smaller relative error E. The program 36 employs the error table coordinate value J from each label candidate area of a respective pair of label candidate areas to determine an error index value L. For example, the error index value L for a pair of label candidate areas is determined by employing two error table coordinate values ($J_1$ from a first label candidate area, and $J_2$ from a second label candidate area) which provide the appropriate location of the error index value present in Table 5:

TABLE 5

|  | Error Index | | | |
|---|---|---|---|---|
| J1 J2 | 0 | 1 | 2 | 3 |
| 0 | 1 | 4 | 5 | 6 |
| 1 | 4 | 1 | 8 | 6 |
| 2 | 5 | 8 | 3 | 3 |
| 3 | 6 | 6 | 3 | 3 |

After determining the error index L from Table 3 for a pair of label candidate areas, the program 36 then determines the relative error E for each of the pair of label candidate areas based on the following criteria:

If L=1, then the relative error $E_i$=Edge-occurrence Absolute Decision Error $e_{Ti}$, where $E_i$ is the relative error of a feature vector $V_i$ of a label candidate area and where i=1, 2—denoting each of the respective pair of label candidate areas;

If L=3, then the relative error $E_i$=Gray Scale Light Intensity Absolute Decision Error $e_{Ii}$;

If L=4, then the relative error $E_i$=(Edge-occurrence Absolute Decision Error $e_{Ti}$+Aspect Ratio Absolute Decision Error $e_R$);

If L=5 and $J_2$=0 and Normalized Dimension Error Code $C_{D2}$=1; or L=5 and $J_2$=2 and Normalized Dimension Error Code $C_{D1}$≠1, then $E_2$<$E_1$; otherwise $E_2$>$E_1$;

If L=6 and $J_1$=3 and Gray Scale Light Intensity Error Code $C_{I1}$=1, then $E_1$=0.5* (Gray Scale Light Intensity Absolute Decision Error $e_{I1}$+Aspect Ratio Absolute Decision Error $e_{R1}$);

If L=6 and $J_2$=3 and Gray Scale Light Intensity Error Code $C_{I2}$=1, then $E_2$=0.5* (Gray Scale Light Intensity Absolute Decision Error $e_{I2}$+Aspect Ratio Absolute Decision Error $e_{R2}$); and If L=8 and $J_2$=2 and Gray Scale Light Intensity Error Code $C_{I2}$=1, then $E_2$<$E_1$; otherwise $E_1$>$E_2$.

After computing the relative error E for each label candidate in step 908, the program 36 continues to step 910. In step 910, the program 36 eliminates overlapping label candidate areas. Label candidate areas are considered to be overlapping if a respective label candidate area overlaps along each dimension of another label candidate area by eighty-five percent (85%). For label candidate areas meeting this overlap criteria, the program 36 eliminates one of the two overlapping label candidate areas according to the following criteria:

If one of the overlapping label candidate areas has an assigned class value of S=1 and the other label candidate area has an assigned class value of S=0, the program 36 will eliminate the candidate area having an class value S=0. Otherwise, the program 36 eliminates the candidate area having a larger relative error E.

In step 912, the multi-resolution label locator program 36 identifies and lists the label candidate areas that most likely contain address labels according to the following criteria: If there are more than three label candidate areas having a class S value=1, then indicate that the three smallest relative error E label candidate areas as the most likely label candidate areas to contain a label; If there are two or three label candidate areas having a class S value=1, then indicate that this group of label candidate areas as the most likely label candidate areas to contain address labels. In other words, if there are less than three candidates with S=1, then match up the label candidates by the smallest relative error candidates with a class S value=0. If there are no label candidate areas or if there is one label candidate area having a class S=0, then indicate that all label candidate areas having a class S=1 and the smallest relative error E label candidates having a class S=0 as the label candidates areas to most likely contain address labels. If there are no candidates having a class S value=1 or=0, then the candidates are not labels.

Output of Prioritized List of Label Candidate Areas

After the program 36 finishes the listing and selection process in step 912, the program 36 continues to routine 106. In routine 106, the multi-resolution label locator system outputs to a display device or other output device (such as a printer), a prioritized list of the label candidate areas that most likely contain address labels. With this prioritized list of label candidate areas, an automated parcel sorting system can process parcel packages at an average speed of twenty-five packages per second with an accuracy rate of about ninety-percent (90%) for images having a low dynamic range. For images with a high dynamic range, the parcel sorting system can process parcel packages with an accuracy of about ninety-five percent (95%).

While the present invention increases parcel processing or sorting accuracy, other applications or embodiments of the multi-resolution locator system are not beyond the scope of the present invention. Other applications or embodiments include, but are not limited to, the following: identifying lead lines or microchips on a printed circuit board; identifying fluorescent markings on parcels; identifying specific shapes on parcels such as hexagon shapes that may indicate franking or the like; locating defects in products such as cracks or other defects detectable by video image processing; identifying defects in the manufacture of colored fabrics; and other like environments where visual characteristics of an object are readily detectable by video image processing.

In the manner described above, the preferred embodiment of the multi-resolution label locator system 20 outputs a predetermined number of candidate label locations based upon a scanned image. It will be appreciated that the present invention provides an improved method and apparatus for locating indicia having characteristics of interest on substrate. Many other modifications and additional features will become evident in view of the preceding description of the exemplary embodiments of the invention. It should be understood, therefore, that the foregoing relates only to the exemplary embodiments of the present invention, and that numerous changes may be made therein without the departing from the spirit and scope of the invention as defined by the following claims.

What is claimed is:

1. A method for locating indicia having characteristics of interest on a substrate, comprising the steps of:

obtaining a video signal defined by a plurality of pixels comprising an input image of the substrate;

dividing the input image into a plurality multi-pixel cells;

creating a decimated image corresponding to the input image comprising a common-characteristic value corresponding to each cell of the input image, each common-characteristic value representing a number of the pixels within the corresponding cell, wherein creating the decimated image includes the steps of,
   computing a histogram of pixel values occurring within the cell,
   selecting from the histogram a mode value corresponding to the pixel value most frequently occurring within the cell, and
   setting the common-characteristic value in the decimated image for the cell to the mode value;
identifying one or more areas within the decimated image having characteristics corresponding to the characteristics of interest;
creating an edge-occurrence image corresponding to the input image comprising an edge value corresponding to each cell of the input image, each edge value representing the number of occurrences of a predetermined edge within the pixels of the corresponding cell;
identifying one or more candidate areas within the input image having decimated-image characteristics and edge-occurrence image characteristics corresponding to the characteristics of interest;
classifying the candidate areas according to likelihood of containing indicia having the characteristics of interest; and
compiling a prioritized list of one or more candidate areas that most likely contain indicia having the characteristics of interest.

2. The method of claim 1, wherein the step of identifying one or more candidate areas within the decimated image having characteristics corresponding to the expected characteristics of the indicia comprises the steps of:
   computing a common-characteristic histogram corresponding to the decimated image; and
   smoothing the common-characteristic histogram with a low-pass filter and an adaptive-moving-window filter;
   selecting one or more peak values from the filtered common characteristic histogram;
   isolating a peak region around each peak value by identifying upper and lower bounding valley values;
   creating a segmented image by mapping the pixels within each peak region into a blank image corresponding the decimated image; and
   identifying one or more connected components within the segmented image.

3. The method of claim 1, wherein the step of creating the edge-occurrence image comprises the steps of, for each cell:
   binarizing the pixel values within the cell;
   identifying transitions in expected orientations among the binarized pixel values within the cell;
   computing a totalized transition value for the cell based on the transitions; and
   setting the edge value for the cell to the totalized transition value for the pixels within the cell.

4. The method of claim 3, wherein the step of binarizing the pixel values within the cell comprises the step of applying an adaptive binarizing technique to the pixel values within the cell to select a threshold for binarizing the pixel values based on identified background pixel values.

5. The method of claim 3, wherein the step of identifying transitions in expected orientations among the binarized pixel values within the cell comprises the step of comparing the pixel values within the cell to a plurality of templates that define pixel patterns that are among the characteristics of interest.

6. The method of claim 5, wherein the step of identifying transitions in expected orientations among the binarized pixel values within the cell comprises the steps of:
   defining a plurality of counters associated with each of a plurality of orientations; and
   for each template
      comparing instances of the template to portions of the cell having the same size as the template such that each pixel of the cell is compared to at least one instance of the template;
      identifying one or more matching pixel patterns within the cell that correspond to a pixel pattern defined by the template;
      identifying an orientation associated with the pixel pattern; and
      incrementing one or more of the counters in response to the occurrence of each matching pixel pattern.

7. The method of claim 6, wherein the step of computing a totalized transition value for a cell comprises the step of:
   applying a totalization formula that filters the counter values to increment the totalized transition value in response to the presence of text within the cell while avoiding incrementing the totalized transition value in response to the presence of one of a barcode and extraneous markings within the cell.

8. The method of claim 2, wherein the step of identifying one or more candidate areas within the input image having decimated-image characteristics and edge-occurrence image characteristics corresponding to the characteristics of interest further comprises the steps of:
   computing a bounding window about each connected component within the segmented image; and
   for each bounding window
      computing one or more window feature values,
      computing one or more feature values corresponding to the cells within the bounding window, and
      assembling a feature vector including the window feature values and the feature values for cells within the bounding window.

9. The method of claim 8, wherein the window feature values are selected from the group including:
   a normalized height representing a ratio of a height defined by the bounding window to a height defined by the segmented image;
   a normalized width representing a ratio of a width defined by the bounding window to a width defined by the segmented image;
   a normalized area representing a ratio of an area defined by the bounding window to an area defined by the segmented image; and
   an aspect ratio representing a ratio of the width defined by the bounding window to the height defined by the bounding window.

10. The method of claim 8, wherein the feature values are selected from the group including:
   a normalized edge-occurrence intensity representing a ratio of the sum of edge values for cells within the bounding window to a total number of cells within the bounding window; and
   a normalized transition intensity representing a ratio of the sum of totalized transition values for cells within the bounding window to an area defined by the bounding window.

11. The method of claim 10, further comprising the step of zeroing totalized transition values for cells within the bounding window below a predefined threshold value to remove noise when computing the normalized transition intensity.

12. The method of claim 8, further comprising the step of preclassifying the candidate areas by applying a qualification selected from the group including:
   eliminating one or more candidate areas having a corresponding bounding window defining an area below a predefined minimum threshold value;
   eliminating one or more candidate areas having a corresponding bounding window defining an area above a predefined maximum threshold value; and
   cropping one or more candidate areas to correspond to a bounding window having a predefined size centered about a center of mass computed for the feature values of the corresponding candidate area.

13. The method of claim 8, wherein the step of classifying the candidate areas according to likelihood of containing indicia having the characteristics of interest further comprises the step of listing the candidate areas by comparing their respective feature vectors.

14. The method of claim 13, wherein the step of listing the candidate areas comprises the steps of, for one or more feature vectors:
   computing a first decision value corresponding to one or more of the window feature values by comparing the window feature value to an expected value of the window feature value, the expected value of the window feature value being among the characteristics of interest; and
   computing a second decision value corresponding to one or more of the cell feature values by comparing the cell feature value to an expected value of the cell feature value, the expected value of the cell feature value being among the characteristics of interest.

15. The method of claim 14, wherein the step of listing the candidate areas comprises the steps of:
   defining a decision space comprising a plurality of decision subspaces;
   listing the decision subspaces; and
   mapping the feature vectors to the decision subspaces based on the relative values of the window and cell feature values of the feature vectors.

16. A method for locating indicia having characteristics of interest on a substrate, comprising the steps of:
   obtaining a video signal defined by a plurality of pixels comprising an input image of the substrate;
   dividing the input image into a plurality multi-pixel cells;
   creating a decimated image corresponding to the input image comprising a common-characteristic value corresponding to each cell of the input image, each common-characteristic value representing a number of the pixels within the corresponding cell;
   identifying one or more areas within the decimated image having characteristics corresponding to the characteristics of interest;
   creating an edge-occurrence image corresponding to the input image comprising an edge value corresponding to each cell of the input image, each edge value representing the number of occurrences of a predetermined edge within the pixels of the corresponding cell, wherein creating the edge-occurrence image includes the steps of,
      binarizing the pixel values within the cell,
      identifying transitions in expected orientations among the binarized pixel values within the cell,
      computing a totalized transition value for the cell based on the transitions, and
      setting the edge value for the cell to the totalized transition value for the pixels within the cell;
   identifying one or more candidate areas within the input image having decimated-image characteristics and edge-occurrence image characteristics corresponding to the characteristics of interest;
   classifying the candidate areas according to likelihood of containing indicia having the characteristics of interest; and
   compiling a prioritized list of one or more candidate areas that most likely contain indicia having the characteristics of interest.

17. The method of claim 16, wherein the step of creating the decimated image comprises the steps of, for each cell:
   computing a histogram of pixel values occurring within the cell;
   selecting from the histogram a mode value corresponding to the pixel value most frequently occurring within the cell; and
   setting the common-characteristic value in the decimated image for the cell to the mode value.

18. The method of claim 16, wherein the step of identifying one or more candidate areas within the decimated image having characteristics corresponding to the expected characteristics of the indicia comprises the steps of:
   computing a common-characteristic histogram corresponding to the decimated image; and
   smoothing the common-characteristic histogram with a low-pass filter and an adaptive-moving-window filter;
   selecting one or more peak values from the filtered common characteristic histogram;
   isolating a peak region around each peak value by identifying upper and lower bounding valley values;
   creating a segmented image by mapping the pixels within each peak region into a blank image corresponding the decimated image; and
   identifying one or more connected components within the segmented image.

19. The method of claim 16, wherein the step of binarizing the pixel values within the cell comprises the step of applying an adaptive binarizing technique to the pixel values within the cell to select a threshold for binarizing the pixel values based on identified background pixel values.

20. The method of claim 16, wherein the step of identifying transitions in expected orientations among the binarized pixel values within the cell comprises the step of comparing the pixel values within the cell to a plurality of templates that define pixel patterns that are among the characteristics of interest.

21. The method of claim 20, wherein the step of identifying transitions in expected orientations among the binarized pixel values within the cell comprises the steps of:
   defining a plurality of counters associated with each of a plurality of orientations; and
   for each template
      comparing instances of the template to portions of the cell having the same size as the template such that each pixel of the cell is compared to at least one instance of the template;
      identifying one or more matching pixel patterns within the cell that correspond to a pixel pattern defined by the template;
      identifying an orientation associated with the pixel pattern; and incrementing one or more of the counters in response to the occurrence of each matching pixel pattern.

22. The method of claim 16, wherein the step of computing a totalized transition value for a cell comprises the step of:

applying a totalization formula that filters the counter values to increment the totalized transition value in response to the presence of text within the cell while avoiding incrementing the totalized transition value in response to the presence of one of a barcode and extraneous markings within the cell.

23. The method of claim 18, wherein the step of identifying one or more candidate areas within the input image having decimated-image characteristics and edge-occurrence image characteristics corresponding to the characteristics of interest further comprises the steps of:

computing a bounding window about each connected component within the segmented image; and for each bounding window
computing one or more window feature values,
computing one or more feature values corresponding to the cells within the bounding window, and
assembling a feature vector including the window feature values and the feature values for cells within the bounding window.

24. The method of claim 23, wherein the window feature values are selected from the group including:

a normalized height representing a ratio of a height defined by the bounding window to a height defined by the segmented image;

a normalized width representing a ratio of a width defined by the bounding window to a width defined by the segmented image;

a normalized area representing a ratio of an area defined by the bounding window to an area defined by the segmented image; and an aspect ratio representing a ratio of the width defined by the bounding window to the height defined by the bounding window.

25. The method of claim 23, wherein the feature values are selected from the group including:

a normalized edge-occurrence intensity representing a ratio of the sum of edge values for cells within the bounding window to a total number of cells within the bounding window; and a normalized transition intensity representing a ratio of the sum of totalized transition values for cells within the bounding window to an area defined by the bounding window.

26. The method of claim 23, further comprising the step of preclassifying the candidate areas by applying a qualification selected from the group including:

eliminating one or more candidate areas having a corresponding bounding window defining an area below a predefined minimum threshold value;

eliminating one or more candidate areas having a corresponding bounding window defining an area above a predefined maximum threshold value; and cropping one or more candidate areas to correspond to a bounding window having a predefined size centered about a center of mass computed for the feature values of the corresponding candidate area.

27. The method of claim 23, wherein the step of classifying the candidate areas according to likelihood of containing indicia having the characteristics of interest further comprises the step of listing the candidate areas by comparing their respective feature vectors.

28. The method of claim 27, wherein the step of listing the candidate areas comprises the steps of, for one or more feature vectors:

computing a first decision value corresponding to one or more of the window feature values by comparing the window feature value to an expected value of the window feature value, the expected value of the window feature value being among the characteristics of interest; and computing a second decision value corresponding to one or more of the cell feature values by comparing the cell feature value to an expected value of the cell feature value, the expected value of the cell feature value being among the characteristics of interest.

29. The method of claim 27, wherein the step of listing the candidate areas comprises the steps of:

defining a decision space comprising a plurality of decision subspaces;

listing the decision subspaces; and mapping the feature vectors to the decision subspaces based on the relative values of the window and cell feature values of the feature vectors.

* * * * *